United States Patent
Chen et al.

(10) Patent No.: US 12,407,817 B2
(45) Date of Patent: Sep. 2, 2025

(54) INTRA PREDICTION WITH GEOMETRIC PARTITION

(71) Applicant: InterDigital CE Patent Holdings, SAS, Paris (FR)

(72) Inventors: Ya Chen, Cesson-Sevigne (FR); Gagan Bihari Rath, Cesson-Sevigne (FR); Karam Naser, Cesson-Sevigne (FR); Antoine Robert, Cesson-Sevigne (FR)

(73) Assignee: InterDigital CE Patent Holdings, SAS, Paris (FR)

(*) Notice: Subject to any disclaimer, the term of this patent is extended or adjusted under 35 U.S.C. 154(b) by 10 days.

(21) Appl. No.: 18/033,649

(22) PCT Filed: Nov. 10, 2021

(86) PCT No.: PCT/EP2021/081266
§ 371 (c)(1),
(2) Date: Apr. 25, 2023

(87) PCT Pub. No.: WO2022/106281
PCT Pub. Date: May 27, 2022

(65) Prior Publication Data
US 2024/0031560 A1 Jan. 25, 2024

(30) Foreign Application Priority Data
Nov. 18, 2020 (EP) ................... 20306397

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/119* (2014.11); *H04N 19/12* (2014.11);
(Continued)

(58) Field of Classification Search
CPC .... H04N 19/105; H04N 19/11; H04N 19/119; H04N 19/12; H04N 19/132;
(Continued)

(56) References Cited

U.S. PATENT DOCUMENTS 9,769,472 B2  9/2017  Liu et al.
2012/0307894 A1* 12/2012  Chien ............... H04N 19/176
                                                    375/E7.243
(Continued)

FOREIGN PATENT DOCUMENTS

EP        2202986 A1    6/2010
WO   WO2016145162 A2   9/2016

OTHER PUBLICATIONS

Choe et al., "VVC Intra Triangular Partitioning Prediction for Screen Contents", Journal of Broadcast Engineering, vol. 25, No. 3, May 1, 2020, pp. 325-337.
(Continued)

*Primary Examiner* — Md N Haque
(74) *Attorney, Agent, or Firm* — Xiaoan Lu

(57) ABSTRACT

In one implementation, when coding a block in the intra prediction mode, the block can be split into two sub-partitions by a geometrically located straight line. Each geometric partition within the CU is intra predicted using its own intra mode with its available reference sample. One sub-partition copies and uses the intra prediction mode from the parent block, and another sub-partition uses another implicit or explicit signaled intra prediction mode. After predicting geometric partition, the sample values along the split boundary are adjusted using a blending process with adaptive weights. The geometric partition based intra prediction could be applied for one angular intra prediction mode, or only for one negative-directional intra prediction mode, or only for one specific intra prediction mode (e.g., mode 34). The transform selection or other intra coding tools
(Continued)

(i.e., intra sub-partition) can be adapted for the geometric partition based intra prediction.

20 Claims, 26 Drawing Sheets

(51) Int. Cl.
*H04N 19/119* (2014.01)
*H04N 19/12* (2014.01)
*H04N 19/132* (2014.01)
*H04N 19/172* (2014.01)
*H04N 19/176* (2014.01)
*H04N 19/61* (2014.01)

(52) U.S. Cl.
CPC ......... *H04N 19/132* (2014.11); *H04N 19/172* (2014.11); *H04N 19/176* (2014.11); *H04N 19/61* (2014.11)

(58) Field of Classification Search
CPC .. H04N 19/147; H04N 19/157; H04N 19/172; H04N 19/176; H04N 19/59; H04N 19/593; H04N 19/61; H04N 19/70
See application file for complete search history.

(56) References Cited

U.S. PATENT DOCUMENTS

| | | | |
|---|---|---|---|
| 2013/0003824 A1* | 1/2013 | Guo ................. | H04N 19/46 375/240.18 |
| 2017/0214939 A1* | 7/2017 | Lee .................. | H04N 19/70 |
| 2020/0359037 A1* | 11/2020 | Ramasubramonian ................ H04N 19/70 | |
| 2021/0168409 A1* | 6/2021 | Furht ................. | H04N 19/96 |
| 2022/0191474 A1* | 6/2022 | Racape .............. | H04N 19/132 |

OTHER PUBLICATIONS

Gao et al., "CE4: CE4-1.1, CE4-1.2 and CE4-1.14: Geometric Merge Mode (GEO)", Joint Video Experts Team (JVET) of ITU-T SG 16 WP 3 and ISO/IEC JTC 1/SC 29/WG 11, 16 Meeting: Geneva, CH, Oct. 1-11, 2019, Document: JVET-P0068-V2, pp. 1-7, 2019.

Chen et al., "Algorithm description for Versatile Video Coding and Test Model 8 (VTM 8)", Document JVET-Q2002, 17th Meeting: Brussels, BE, Jan. 7-17, 2020, 97 pages.

* cited by examiner distance 0      distance 1 distance 2      distance 3 cu_sbp_flag = 1 &
cu_sbp_pos = 0

(a)

cu_sbp_flag = 1 &
cu_sbp_pos = 1

(b)

(a)

(b)

(c)

Horizontal Negative Direction (a)

Vertical Negative Direction (b)

(c)

(a) Horizontal Positive Directional Mode (b) Vertical Positive Directional Mode

INTRA PREDICTION WITH GEOMETRIC PARTITION

CROSS REFERENCE TO RELATED APPLICATIONS

This application is a U.S. National Stage Application under 35 U.S.C. 371 of International Patent Application No. PCT/EP2021/081266, filed Nov. 10, 2021, which is incorporated herein by reference in its entirety.

This application claims the benefit of European Patent Application No. EP20306397.9 filed Nov. 18, 2020, which is incorporated herein by reference in its entirety.

TECHNICAL FIELD

The present embodiments generally relate to a method and an apparatus for intra prediction with geometric partition in video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding or decoding is provided, comprising: splitting a block of a picture into at least two partitions by a straight line; performing intra prediction with a first intra prediction mode on a first partition of said at least two partitions to obtain prediction samples for said first partition; performing intra prediction with a second intra prediction mode on a second partition of said at least two partitions to obtain prediction samples for said second partition; and adjusting prediction sample values along said straight line using a blending process with adaptive weights.

According to another embodiment, an apparatus for video encoding or decoding is presented, comprising one or more processors, wherein said one or more processors are configured to: split a block of a picture into at least two partitions by a straight line; perform intra prediction with a first intra prediction mode on a first partition of said at least two partitions to obtain prediction samples for said first partition; perform intra prediction with a second intra prediction mode on a second partition of said at least two partitions to obtain prediction samples for said second partition; and adjust prediction sample values along said straight line using a blending process with adaptive weights.

According to another embodiment, an apparatus for video encoding or decoding is presented, comprising: means for splitting a block of a picture into at least two partitions by a straight line; means for performing intra prediction with a first intra prediction mode on a first partition of said at least two partitions to obtain prediction samples for said first partition; means for performing intra prediction with a second intra prediction mode on a second partition of said at least two partitions to obtain prediction samples for said second partition; and means for adjusting prediction sample values along said straight line using a blending process with adaptive weights.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above.

One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
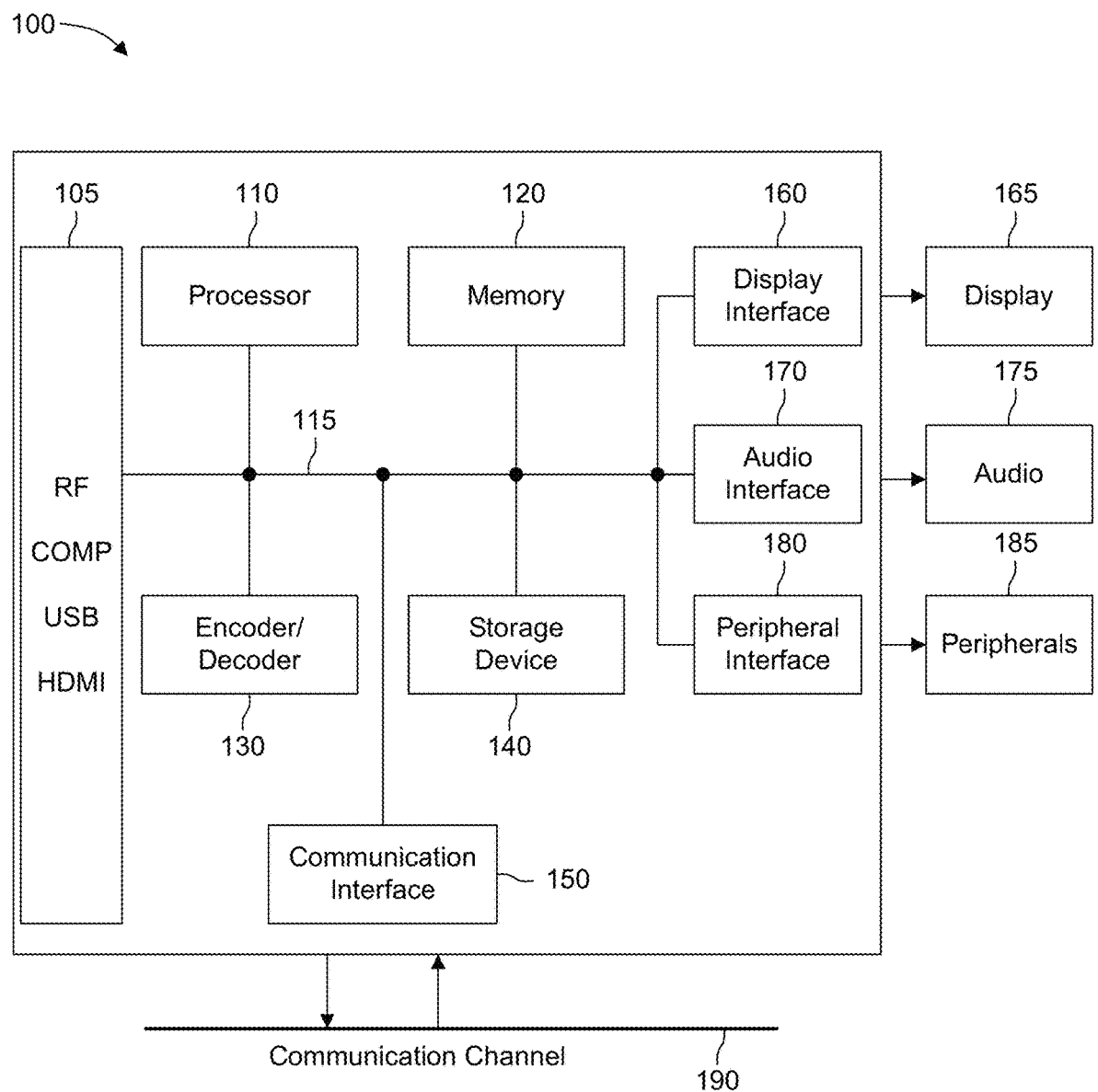
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
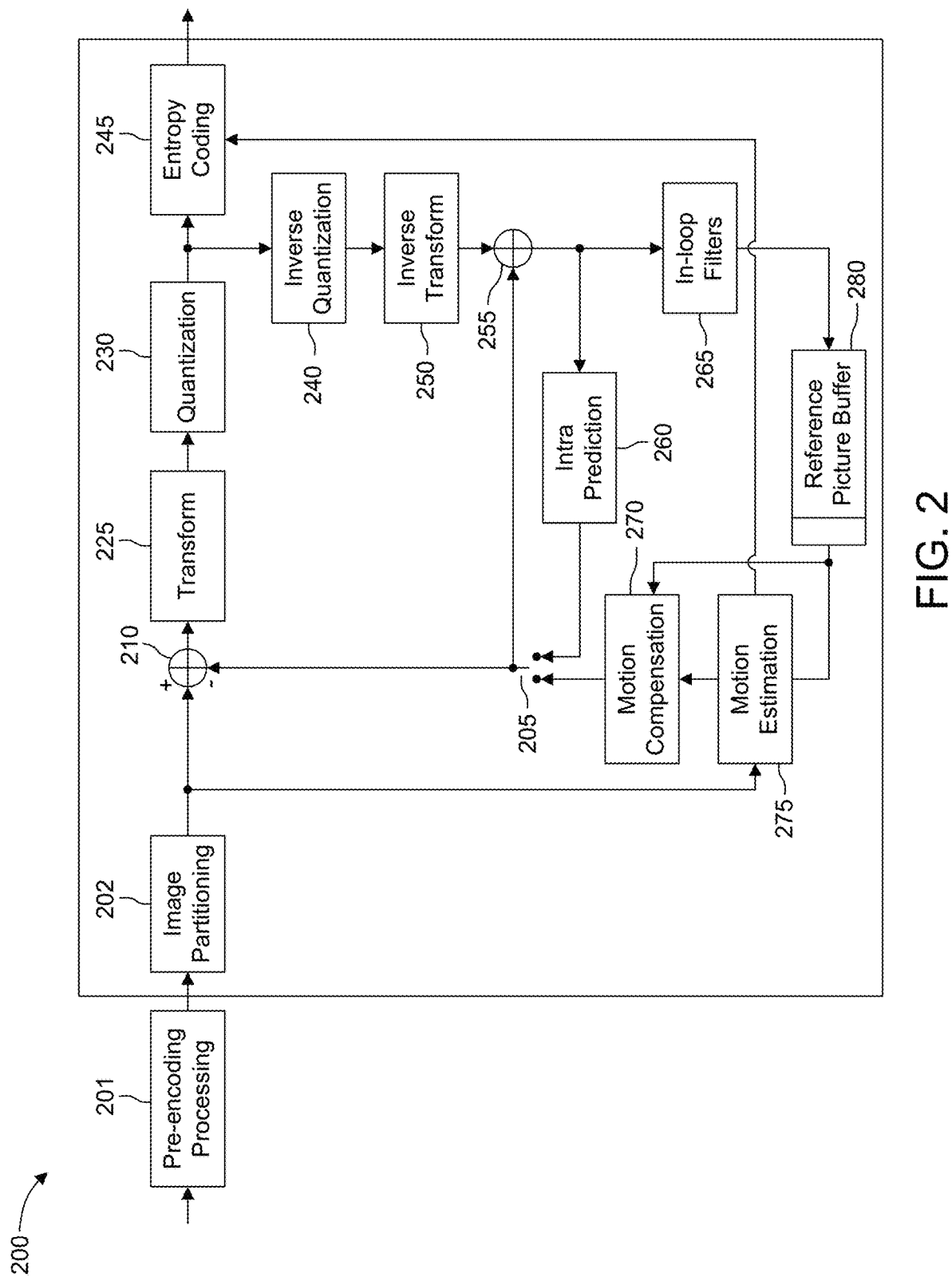
FIG. 2 illustrates a block diagram of an embodiment of a video encoder.

FIG. 2 illustrates an example video encoder 200, such as a VVC (Versatile Video Coding) encoder. FIG. 2 may also illustrate an encoder in which improvements are made to the VVC standard or an encoder employing technologies similar to VVC.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
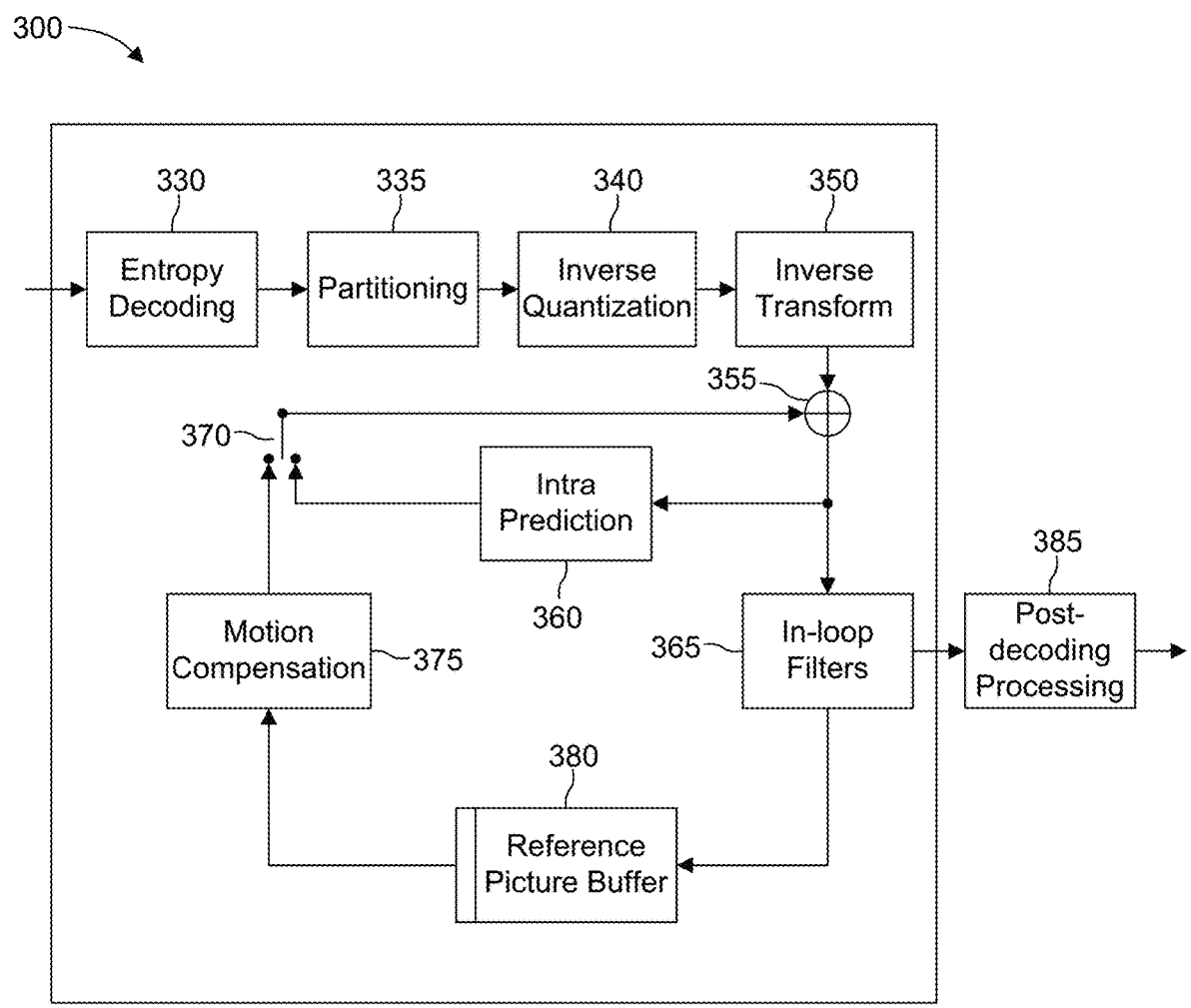
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
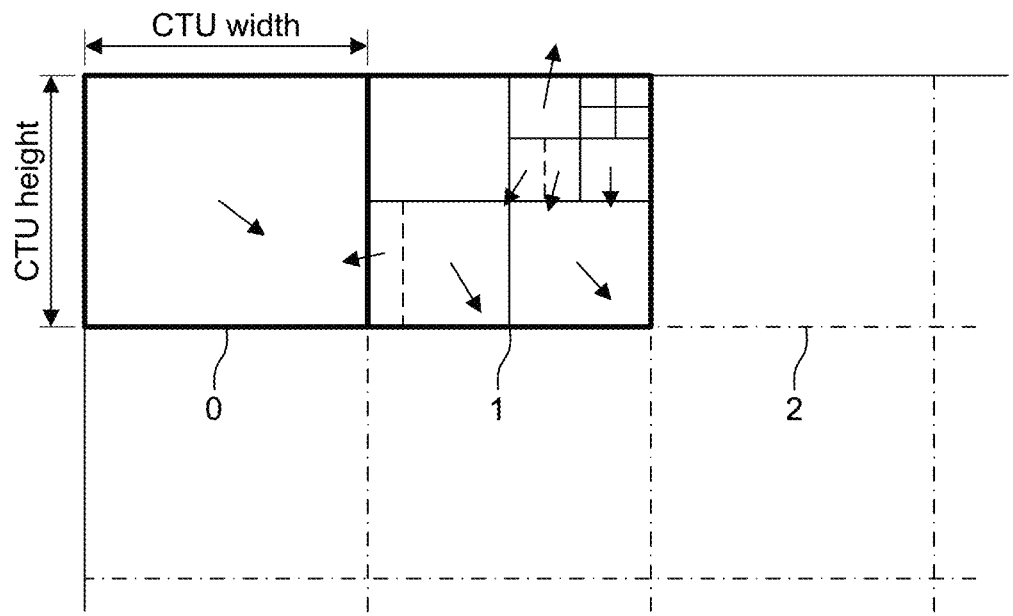
FIG. 4 illustrates Coding Tree Unit (CTU) and Coding Unit (CU) concepts to represent a compressed VVC picture.

As described above, in the VVC video compression, a picture is divided into so-called Coding Tree Units (CTU), and each CTU is represented by one or more Coding Units (CUs) in the compressed domain as shown in FIG. 4. Each CU is then given some Intra or Inter prediction parameters (Prediction Info).

In Intra prediction, a CU is spatially predicted from the causal neighbor CUs, i.e., the decoded CUs on the top and the left of the current CU. For that purpose, VVC uses simple spatial models called prediction modes. Based on the decoded pixel values in the top and left CUs, called reference pixels, the encoder constructs different predictions for the target block and chooses the one that leads to the best RD performance. Out of the 95 pre-defined modes, one is a planar mode (indexed as mode 0), one is a DC mode (indexed as mode 1) and the remaining 93 (indexed as mode −14 . . . −1, 2 . . . 80) are angular modes. The angular modes aim to model the directional structures of objects in a frame. Therefore, the decoded pixel values in the top and left CUs are simply repeated along the pre-defined directions to fill up the target CU.

The angular prediction modes can describe image regions containing object structures with different directionalities. The PLANAR and DC modes describe constant and gradually changing regions without any particular directionality. But inside a frame there may be blocks which contain part of an object and the background, or parts of the same or multiple objects having different directionalities. Such blocks usually cannot be inadequately described by a single angular mode or a non-angular mode (i.e., the PLANAR and DC modes). In the following, we briefly present the intra prediction and geometric partition in VVC. For easier reference, we will be using the terms "CU" and "block" interchangeably throughout the text.

Intra Prediction in VVC

Figure 5:
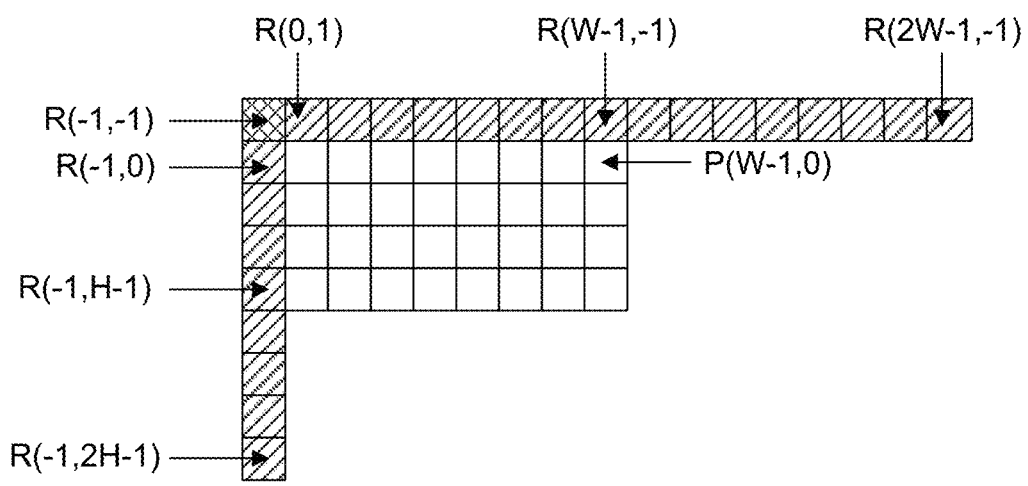
FIG. 5 illustrates reference samples for intra prediction in VVC.

The intra prediction process in VVC consists of three steps: (1) reference sample generation, (2) intra sample prediction, and (3) post-processing of predicted samples. The reference sample generation process is illustrated in FIG. 5. The reference pixel values at co-ordinates (x,y) are indicated in the figure by R(x,y). For a CU of size W×H, where W and H denote the width and the height, respectively, a row of 2W decoded samples on the top is formed from the previously reconstructed top and top-right pixels to the current CU. Similarly, a column of 2H samples on the left is formed from the reconstructed left and below-left pixels. The corner pixel at the top-left position is also used to fill up the gap between the top row and the left column references.

Figure 6:
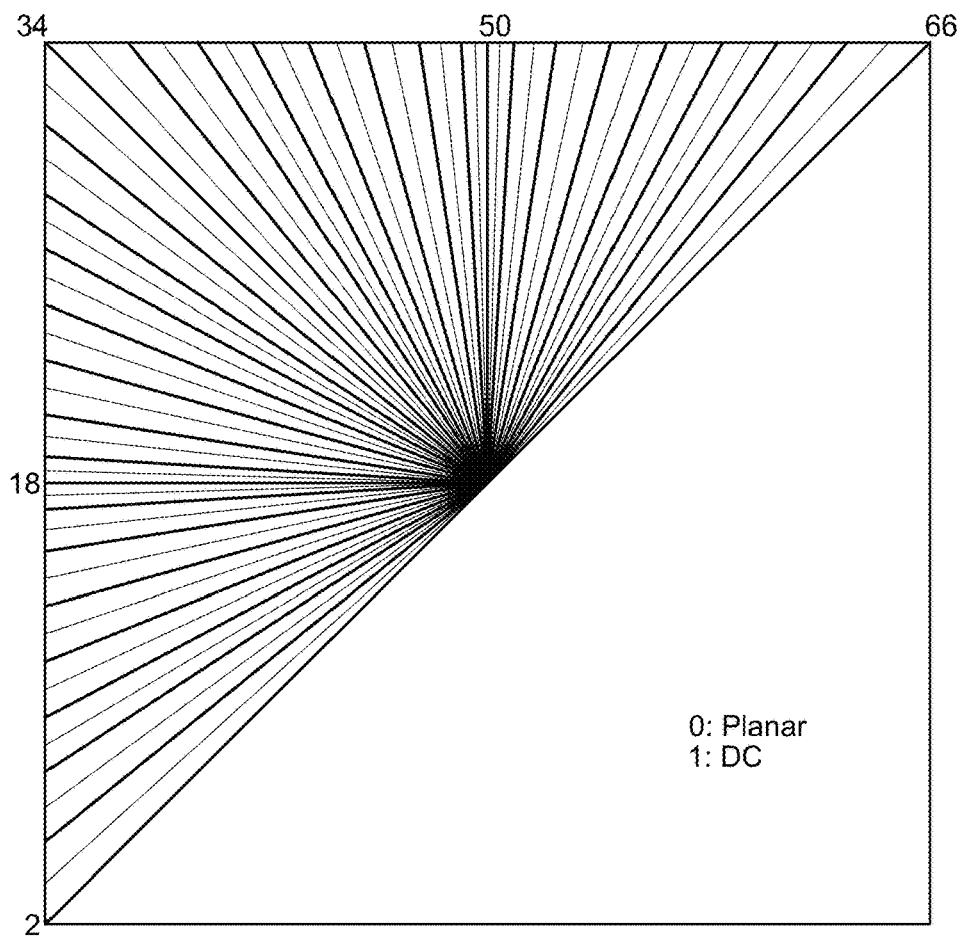
FIG. 6 illustrates intra prediction directions in VVC for a square target block.

The next step, i.e., the intra sample prediction, consists of predicting the pixels of the target CU based on the reference samples. As mentioned before, in order to predict different kinds of content efficiently, VVC supports a range of prediction modes. Planar and DC prediction modes are used to predict smooth and gradually changing regions, whereas angular prediction modes are used to capture different directional structures. VVC supports 95 directional prediction modes which are indexed from −14 to −1 and from 2 to 80. For a square CU, only prediction modes 2-66 are used. These prediction modes correspond to different prediction directions from 45 degree to −135 degree in clockwise direction, as illustrated in FIG. 6. The number denotes the prediction mode index associated with the corresponding direction. Modes 2 to 33 indicate horizontal predictions and modes 34 to 66 indicate vertical predictions.

The modes are defined by intraPredAngle (A), the offset of the predictor with respect to the (0, 0) position in horizontal/vertical direction as shown in Table 1. When intraPredAngle (A) equals to 0, the prediction mode might be strictly horizontal mode (mode 18) or vertical mode (mode 50); when the value of intraPredAngle (A) is negative, the prediction mode is a negative direction, i.e., a mode in the range 19-49, and when the value of intraPredAngle (A) is positive, the prediction mode is a positive direction, i.e., any of the remaining angular modes.

TABLE 1 mapping between intra prediction modes and intraPredAngle (A) in VVC.

| mode | 2  | 3  | 4  | 5  | 6  | 7  | 8  | 9  | 10 | 11 | 12 | 13 | 14 | 15 | 16 | 17 | 18 |
|------|----|----|----|----|----|----|----|----|----|----|----|----|----|----|----|----|----|
| A    | 32 | 29 | 26 | 23 | 20 | 18 | 16 | 14 | 12 | 10 | 8  | 6  | 4  | 3  | 2  | 1  | 0  |

TABLE 1-continued mapping between intra prediction modes and intraPredAngle (A) in VVC.

| mode | 19 | 20 | 21 | 22 | 23 | 24 | 25 | 26 | 27 | 28 | 29 | 30 | 31 | 32 | 33 | 34 | 35 |
|------|----|----|----|----|----|----|----|----|----|----|----|----|----|----|----|----|----|
| A    | −1 | −2 | −3 | −4 | −6 | −8 | −10 | −12 | −14 | −16 | −18 | −20 | −23 | −26 | −29 | −32 | −29 |
| mode | 36 | 37 | 38 | 39 | 40 | 41 | 42 | 43 | 44 | 45 | 46 | 47 | 48 | 49 | 50 | 51 | 52 |
| A    | −26 | −23 | −20 | −18 | −16 | −14 | −12 | −10 | −8 | −6 | −4 | −3 | −2 | −1 | 0 | 1 | 2 |
| mode | 53 | 54 | 55 | 56 | 57 | 58 | 59 | 60 | 61 | 62 | 63 | 64 | 65 | 66 | | | |
| A    | 3 | 4 | 6 | 8 | 10 | 12 | 14 | 16 | 18 | 20 | 23 | 26 | 29 | 32 | | | |

After the second step, some prediction modes can lead to discontinuities along the top and left reference boundaries, hence those prediction modes include a subsequent post-processing, known as position dependent intra prediction combination (PDPC), which aims to smoothen the predicted pixel values near those boundaries.

Geometric Partition in VVC

For better alignment of inter prediction boundary with objects, in WET-P0068 (see Han Gao, et al., "CE4: CE4-1.1, CE4-1.2 and CE4-1.14: Geometric Merge Mode (GEO)", Document JVET-P0068, 16th Meeting: Geneva, CH, 1-11 Oct. 2019), a geometric merge mode has been proposed with 32 angles and 5 distances in inter prediction for VVC. When the geometric merge mode is used, a CU is split into two partitions. Each partition in the CU is inter-predicted using its own motion parameters; only uni-prediction is allowed for each partition, that is, each partition has one motion vector and one reference index. After predicting each of the partitions, the sample values along the splitting edge are adjusted using a blending process with adaptive weights.

Figure 7:
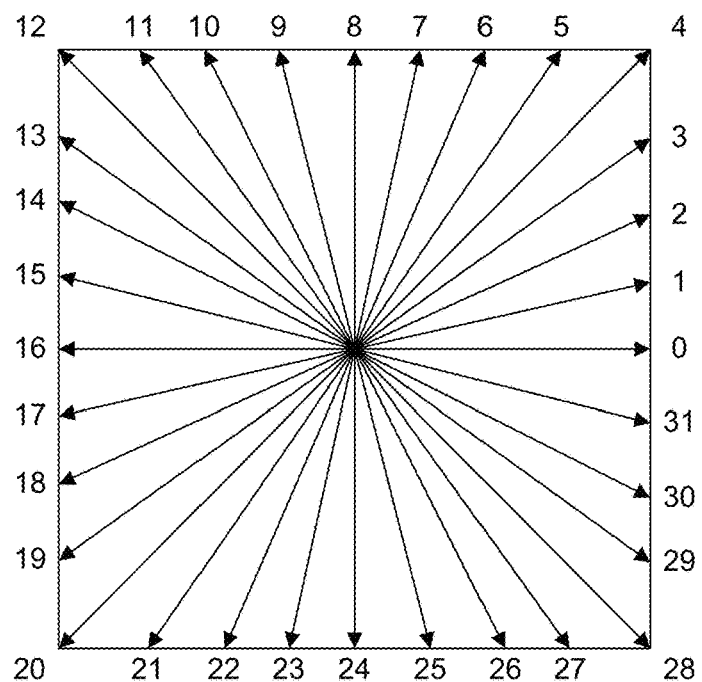
FIG. 7 illustrates 32 angles in Geometric mode for inter prediction in VVC.
Figure 8:
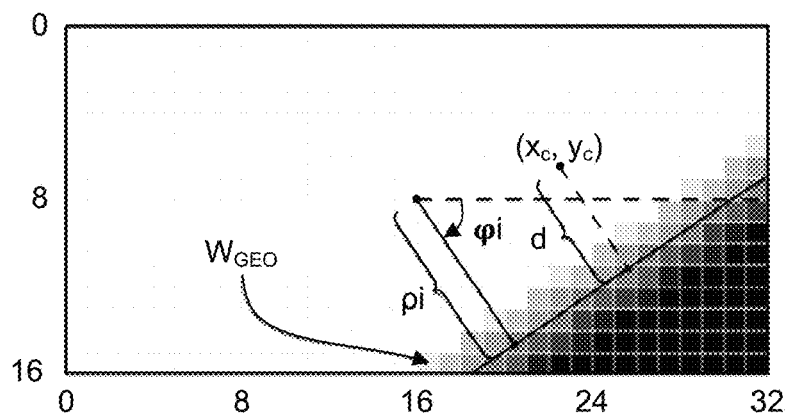
FIG. 8 illustrates geometric split description.
Figure 9:
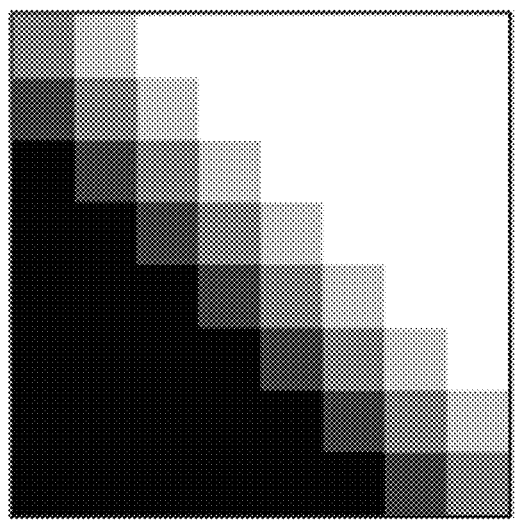
FIG. 9 illustrates geometric partition with Angle 12 and distance between 0 to 3.
Figure 9:
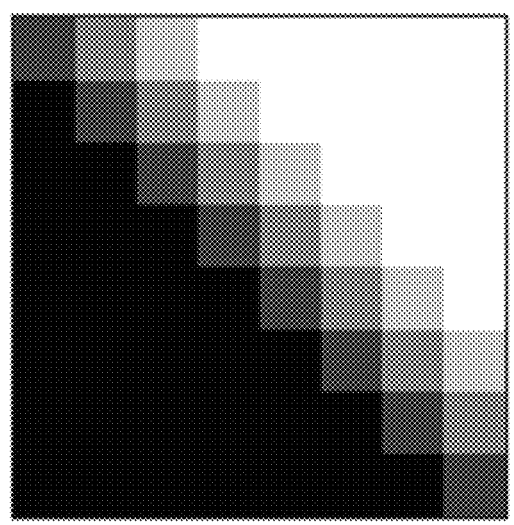
Figure 9:
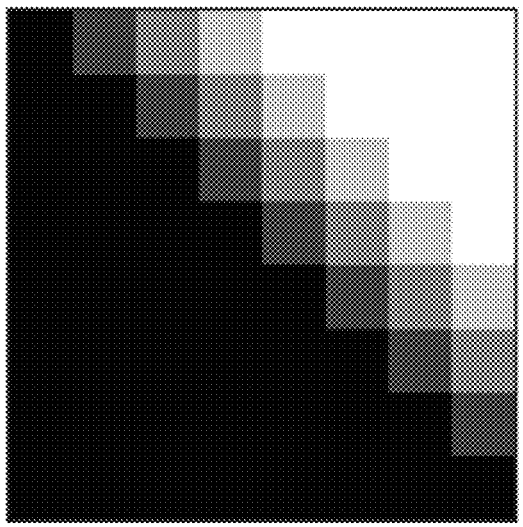
Figure 9:
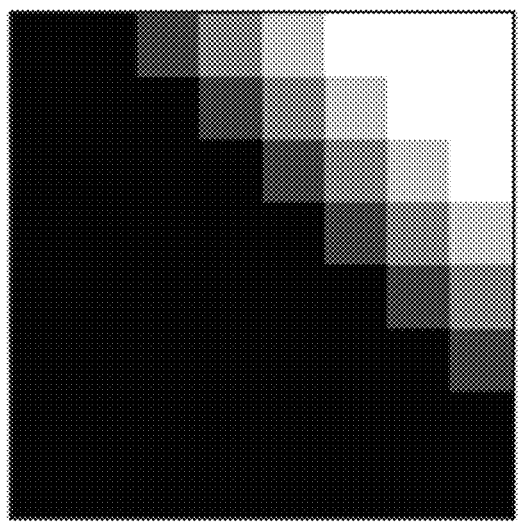

The split boundary can be described by angle $\varphi_i$ and distance offset $\rho_i$. The angle $\varphi_i$ is quantized from 0 degree to 360 degrees with a step equal to 11.25 degrees. In total 32 angles are proposed as shown in FIG. 7. The description of a geometric split with angle $\varphi_i$ and distance $\rho_i$ is depicted in FIG. 8. Distance $\rho_i$ is quantized from the largest possible distance $\rho_{max}$ with a fixed step, which indicates a distance from the center of the block. For distance $\rho_i=0$, only the first half of the angles are available as splits are symmetric in this case. The results of geometric partitioning using angle 12 and distance between 0 and 3 is depicted in FIG. 9.

Figure 10:
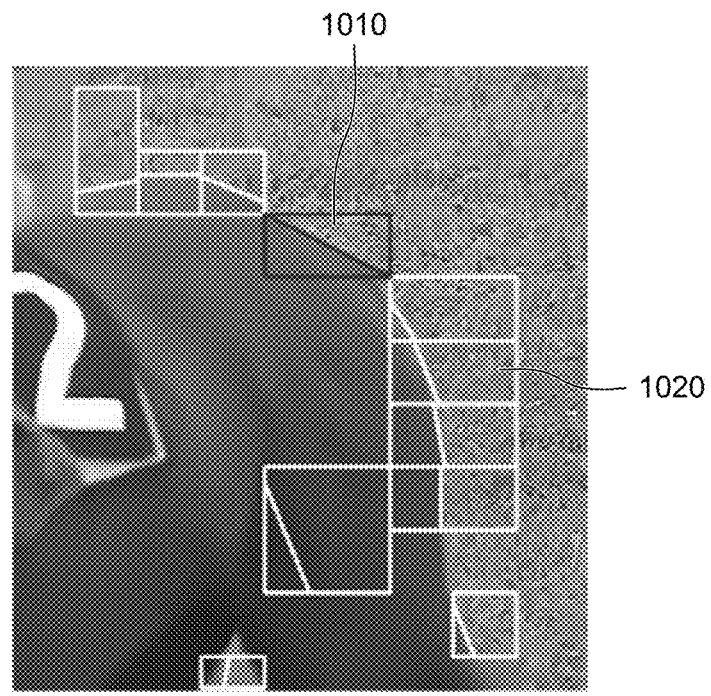
FIG. 10 illustrates an non-rectangular partitioning example for a portion of a picture.

As shown in FIG. 10, some examples of non-rectangular partitioning in inter prediction, e.g., diagonal partitioning (1010) and general geometric partitioning (1020), are quite useful for outlining the complicate shapes of objects from the background or other objects. In VVC, only rectangular (including square) partitioning is applied on intra frames, so the objects with very different features could be contained inside one intra-coded block. If any block has changing region along certain directions and constant changing region at the same time, or if any block has more than one changing regions along different directions, they usually cannot be inadequately described by either a single corresponding angular mode, or the PLANAR or the DC mode.

Figure 11:
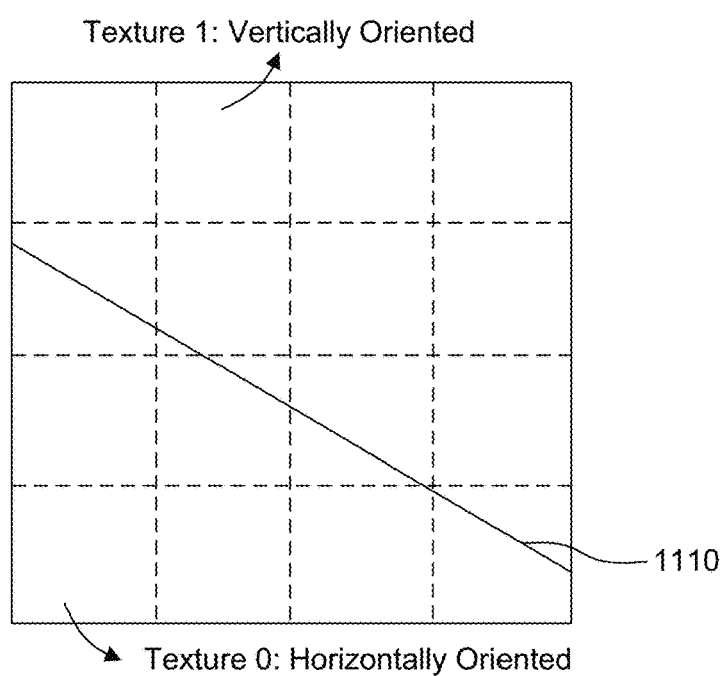
FIG. 11 illustrates an example of a piecewise smooth image model.

For instance, if we consider a piecewise smooth image model as illustrated in FIG. 11, where two different smooth regions, with different smoothness properties, are separated by an edge (1110), it is less accurate to predict both regions with a single intra prediction model. In near-edge areas, they could be continually partitioned into smaller square/rectangular blocks and coded as smaller blocks separately. However, these smaller prediction blocks with similar data might result in unnecessary overhead.

To better model such blocks, we propose intra geometric partition to be used. In particular, we propose geometric/diagonal partition based intra prediction to adapt to compli- cated features of natural images. Different embodiments are provided, which can include one or more of the following:

1. Split an intra-predicted CU into two or more sub-partitions by a geometrically located straight line (including diagonal splitting).
2. Each geometric partition within the CU, is intra-predicted using its own intra mode with its available reference samples, respectively. One sub-partition copies and uses the intra prediction mode from the parent CU; another sub-partition uses another implicit or explicit signaled intra prediction mode.
3. After predicting each geometric partition, the sample values along the split boundary are adjusted using a blending process with adaptive weights.
4. The geometric partition based intra prediction could be applied for one angular intra prediction mode, or only for one negative-directional intra prediction mode, or only for one specific intra prediction mode (e.g., mode 34).
5. The Rate-Distortion (RD) cost of geometric partition based intra prediction could be checked after or before the optimal intra prediction mode is selected.
6. Adapt the transform selection or other intra coding tools (i.e., intra sub-partition) for the geometric partition based intra prediction.

In the following, several embodiments with respect to intra geometric partition are described in detail.

Diagonal Partition Based Intra Prediction for Negative-Directional Mode

Figure 12:
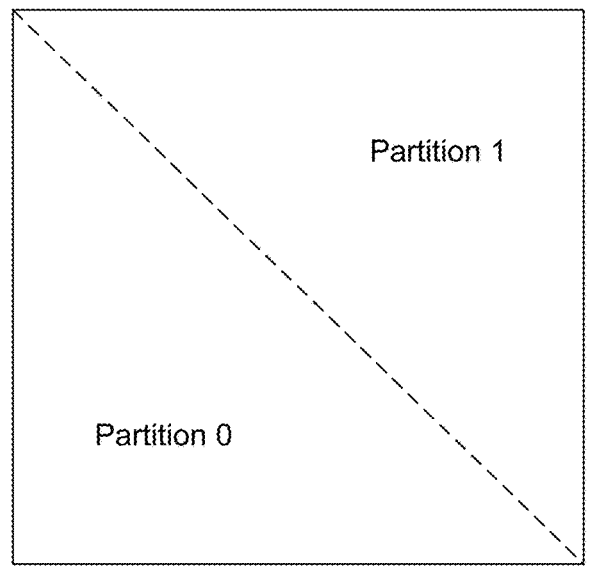
FIG. 12 illustrates diagonal partition based intra prediction.
Figure 12:
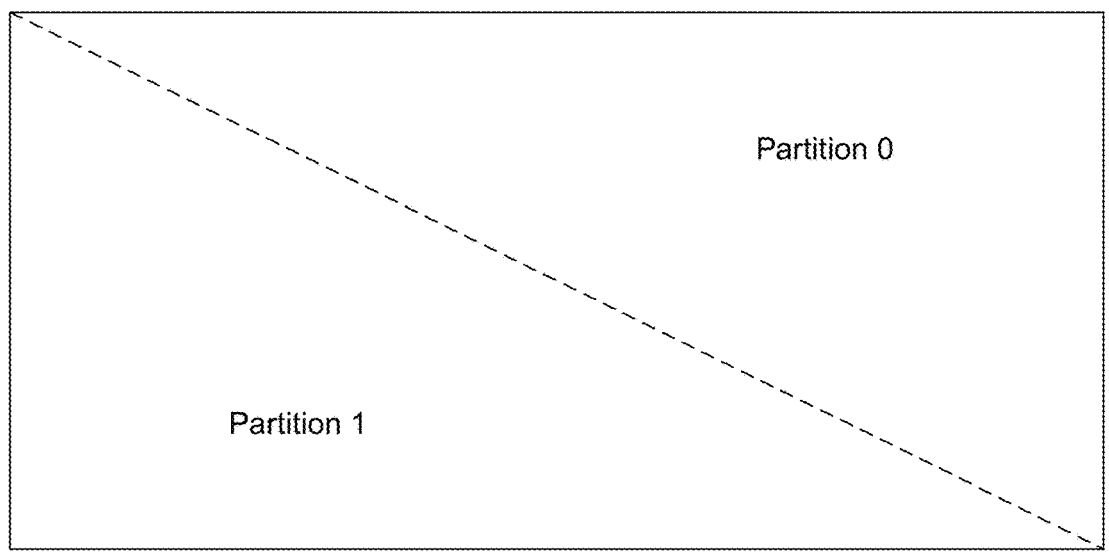

In this embodiment, after one negative-directional intra prediction mode is selected out of these defined modes for a target CU that leads to the best RD performance, this target CU could be split into two triangle-shaped partitions, using the diagonal split from the top-left position, as illustrated in FIG. 12. Specifically, a sub-partition flag cu_sbp_flag is signaled for an intra CU, and diagonal partition is further applied on this intra CU if cu_sbp_flag equals to 1.

Figure 13:
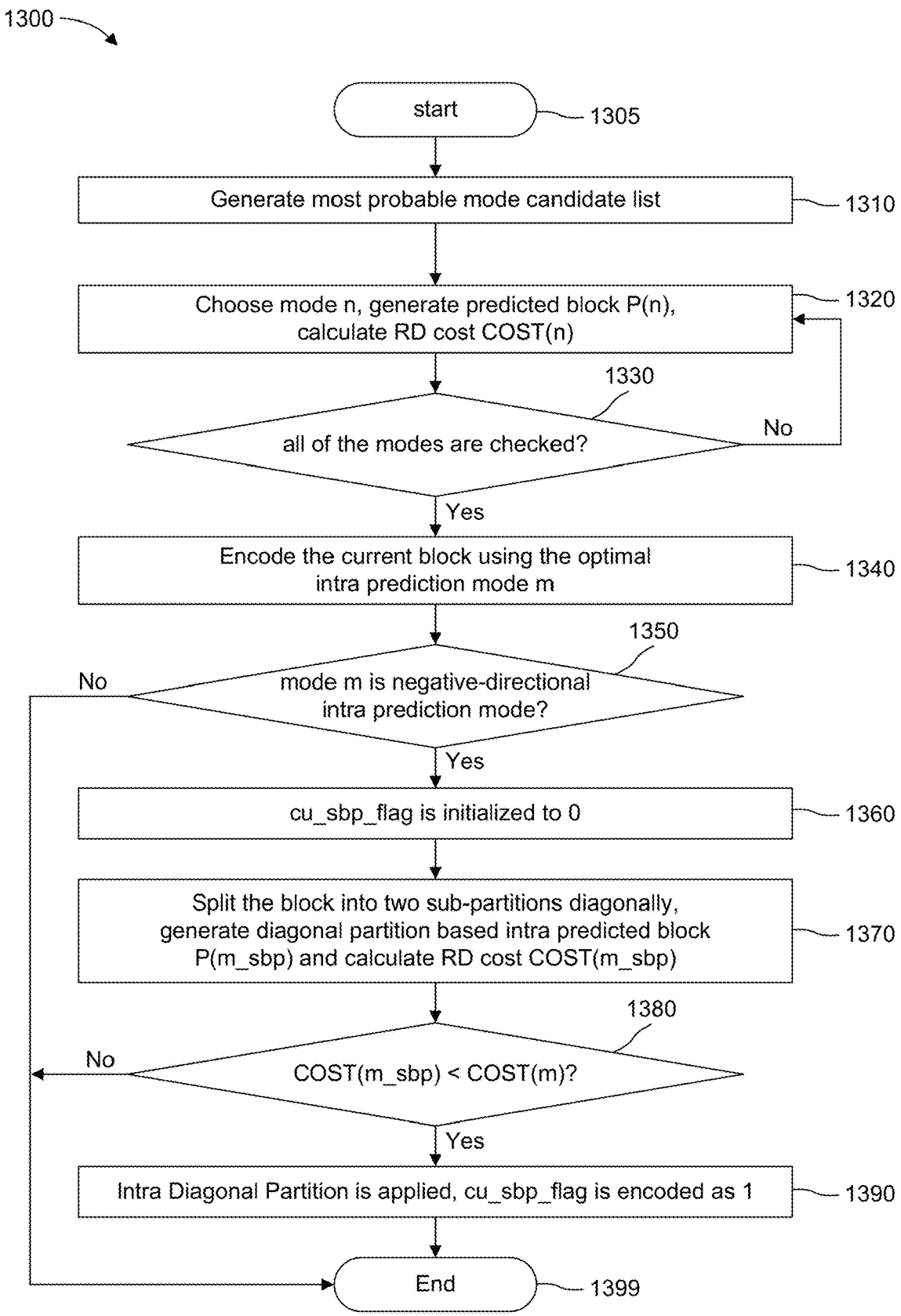
FIG. 13 illustrates a method of diagonal partition based intra prediction at the encoder, according to an embodiment.

FIG. 13 illustrates a method (1300) of diagonal partition based intra prediction for an image block at the encoder, according to an embodiment. Method 1300 starts at step 1305. At step 1310, the most probable mode (MPM) candidate list is generated. At steps 1320 and 1330, the encoder checks all potential intra prediction modes, by generating prediction blocks P(n) and calculating the RD cost COST(n) for each potential intra prediction mode n. The optimal intra prediction mode m (e.g., the one with smallest RD cost) is used to encode (1340) the current block. If a negative-directional intra prediction mode is selected out of these pre-defined modes (1350), the diagonal partition is checked. At step 1360, a sub-partition flag cu_sbp_flag to indicate whether the block is split into two sub-partitions diagonally or not, is initialized to 0. At step 1370, the block is diagonally split and the related RD cost with splitting is calculated. The RD cost with and without splitting is compared (1380). If the proposed diagonal partition based intra prediction has a smaller RD cost, diagonal partition is applied for the intra block, and the sub-partition flag cu_sbp_flag is encoded as 1 (1390). Method 1300 ends at step 1399.

Figure 14:
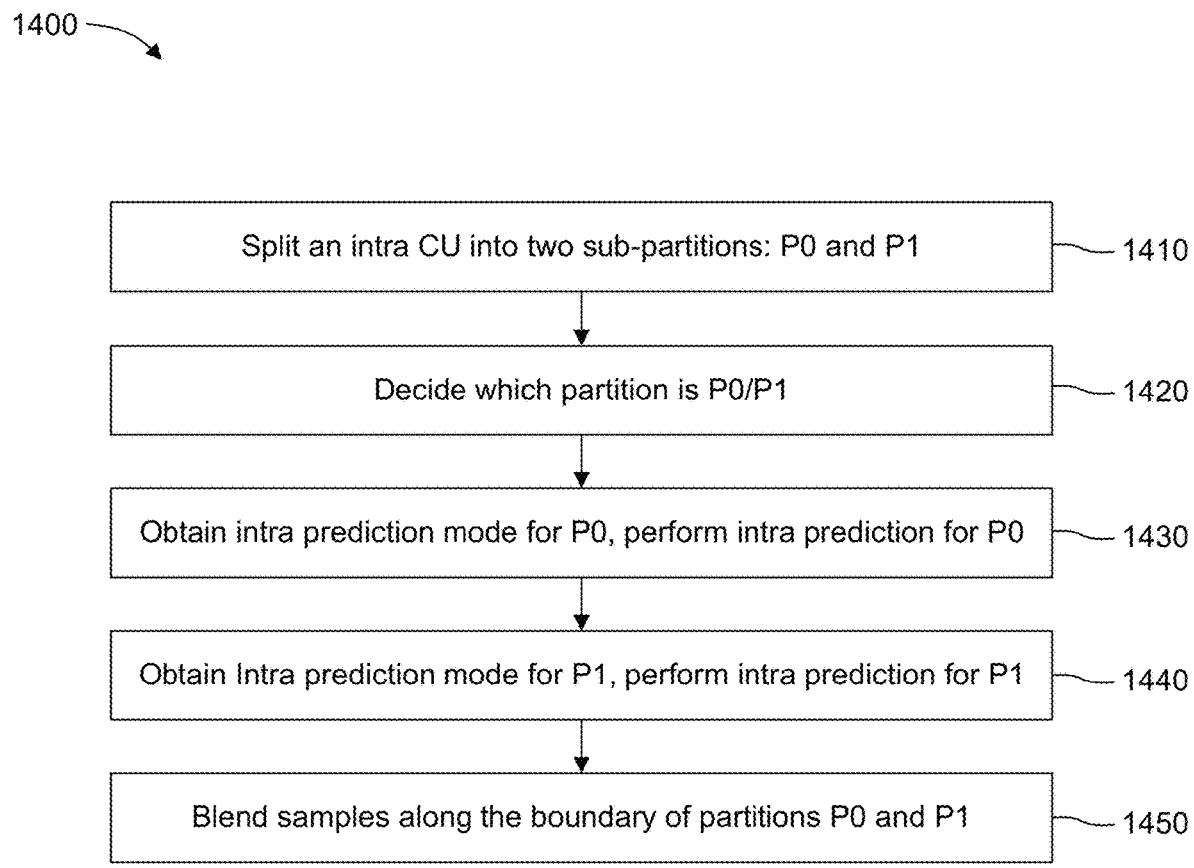
FIG. 14 illustrates the generation process of the diagonal partition based intra predicted block, according to an embodiment.

FIG. 14 illustrate the generation process 1400 of the diagonal partition based intra predicted block, according to an embodiment. Method 1400 can be used in step 1370 to apply intra diagonal partition. When this diagonal partition is used, an intra CU is split into two triangle-shaped child partitions: Partition 0 and Partition 1 (1410). Partition 0 is inferred to use the negative-directional intra prediction mode of the parent CU. Another child Partition 1 is then intra-predicted using another default or signaled intra prediction mode. By allowing two different intra prediction modes for an intra block with two regions with different smoothness properties, more accurate prediction could be expected.

A partition position flag cu_sbp_pos is signaled to indicate which child partition is Partition 0 (1420). As shown in FIGS. 12(*a*) and 12(*b*) respectively, Partition 0 is the region located near the left boundary when cu_sbp_pos equals to 0; on the contrary, Partition 0 is the region located near the above boundary when cu_sbp_pos equals to 1. In order to further improve the coding efficiency and simplify the coding process, the partition position flag cu_sbp_pos could also be implicit under some conditions as described hereinafter, and the signaling could be skipped.

The intra prediction mode of Partition 0 is directly copied from the current CU (1430). Depending on different design philosophies, the intra prediction mode of Partition 1 could either be explicitly signaled, or be implicitly signaled as a default intra prediction mode (1440).

Each child partition is intra predicted with its intra prediction mode and its available reference samples, respectively. After predicting each of the triangle partitions, the sample values along the diagonal edge/boundary are adjusted using a blending process with adaptive weighting masks or factors (1450). Further details for steps 1420, 1440 and 1450 will be described below.

Figure 15:
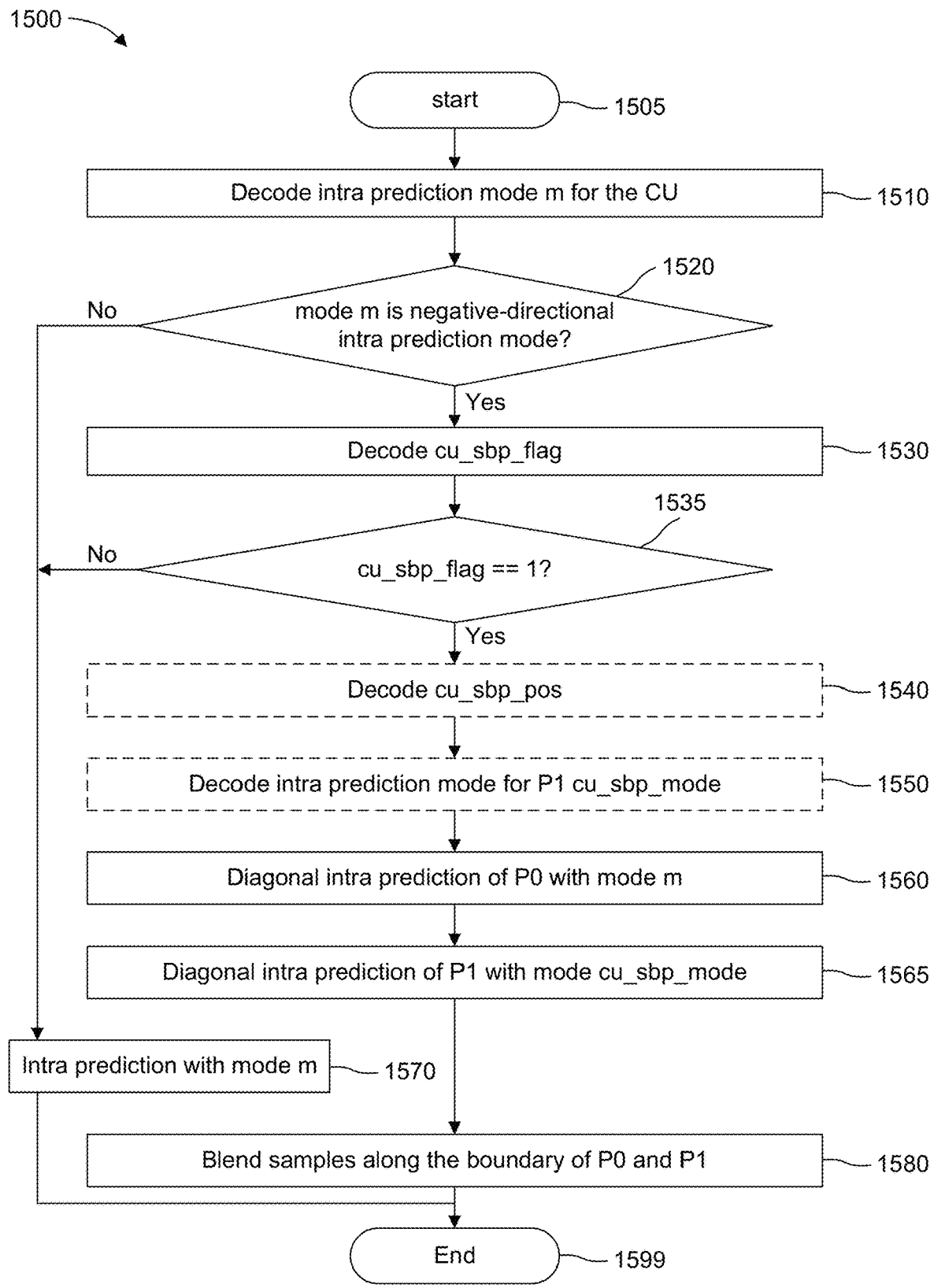
FIG. 15 illustrates the proposed diagonal partition based intra prediction process at the decoder, according to an embodiment.

FIG. 15 illustrates a method (1500) for performing the diagonal partition based intra prediction at the decoder, according to an embodiment. Method 1500 starts at step 1505. The intra prediction mode m for a CU is decoded at step 1510. If this intra prediction mode is a negative-directional intra prediction mode (1520), a sub-partition flag cu_sbp_flag is decoded to indicate whether the block is split into two sub-partitions diagonally or not (1530). If the intra prediction mode m is not negative-directional, or cu_sbp_flag equals to 0, this CU will be intra predicted with its intra mode m (1570). If the CU is diagonal split (1535), a partition position flag cu_sbp_pos is explicitly or implicitly decoded to indicate which child partition is Partition 0 (1540). For Partition 1, an additional intra prediction mode cu_sbp_mode is explicitly or implicitly decoded (1550), and it is used for the intra prediction of Partition 1 (1565); for Partition 0, it is intra predicted with the intra prediction mode m, which is directly copied from its parent CU (1560). After obtaining the predicted Partition 0 and Partition 1, they are blended to get the final predicted CU (1580). Method 1500 ends at step 1599.

One reason for applying further diagonal partition only on negative-directional intra prediction modes is to make sure that there are reference samples available for predicting both triangle-shaped partitions. According to a variant of this embodiment, the proposed diagonal intra partition is enable only if the intra prediction mode 34 is selected.

Decision of Partition 0 and Partition 1 using a Partition Position Flag cu_sbp_pos (1420)

As described in FIG. 14 and FIG. 15, a partition position flag cu_sbp_pos is signaled to indicate which region of the parent intra CU is intra-predicted using the intra prediction mode copied from the parent CU (Partition 0). The remaining region (Partition 1) is intra-predicted using another default or signaled mode.

As shown in FIG. 12, Partition 0 is the region located near the left boundary when cu_sbp_pos equals to 0; on the contrary, Partition 0 is the region located near the above boundary when cu_sbp_pos equals to 1.

Rather than signalling the partition position flag cu_sbp_pos, the position of partition intra-predicted with the inferred mode (Partition 0) could be implicit under some conditions to further improve the coding efficiency and simplify the coding process.

Figure 16:
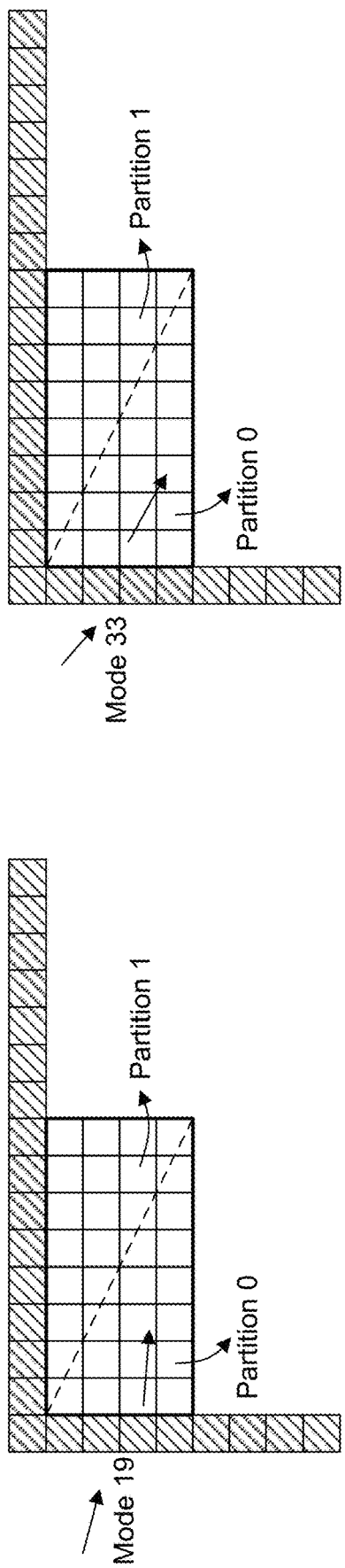
FIG. 16 illustrates how to decide Partition 0 according to the negative-directional intra prediction mode of the parent intra CU, according to an embodiment.
Figure 16:
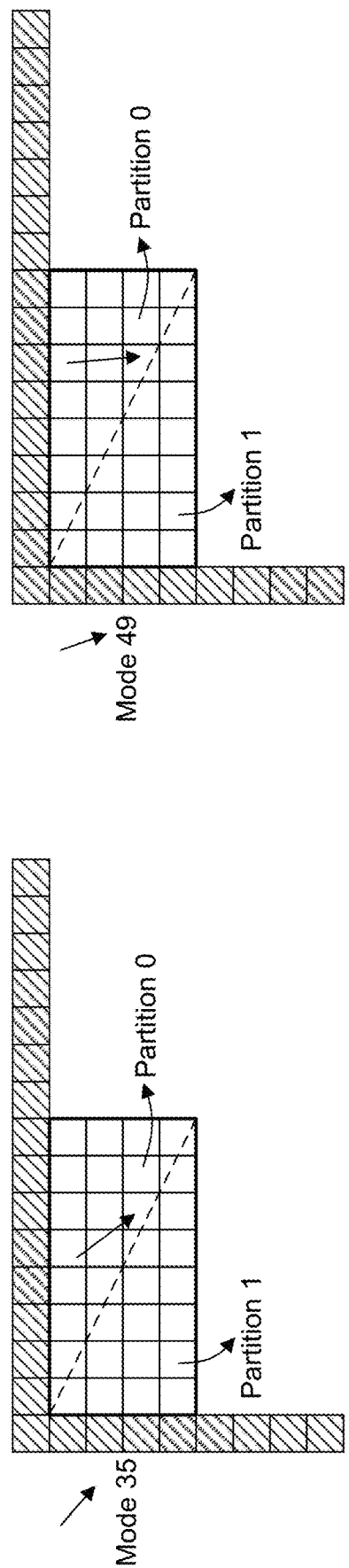

In one example, Partition 0 could be implicit according to the negative-directional intra prediction mode of the parent intra CU as shown in FIG. 16. If the intra prediction mode of the parent intra CU belongs to horizontal negative directions (e.g., modes 19 to 33 as shown in FIG. 6), Partition 0 is the region located near the left boundary; otherwise, for vertical negative directions (e.g., modes 34 to 49 as shown in FIG. 6), Partition 0 is the region located near the above boundary. One reason for this implicit signaling is that if diagonal partition is further applied on an intra CU, when the intra prediction mode of this CU belongs to horizontal directions, it is likely to use the left reference array to perform horizontal intra-prediction on the region near the left boundary; and the remaining region having different changing property, could be better intra-predicted using another default or signaled mode.

The range of the horizontal and vertical negative directions defined for this implicit signaling method could be further reduced or increased. For example, only modes 19 to 26 as shown in FIG. 6 could be classified into horizontal negative directions to which implicit signaling of P0/P1 partition will be applied, and modes 42 to 49 as shown in FIG. 6 are included in vertical negative directions to which implicit signaling of P0/P1 partition will be applied.

Intra Prediction Mode of the Partition 1 cu_sbp_mode (1440)

As described in FIG. 14 and FIG. 15, Partition 0, which is a child partition of the target intra CU, is intra-predicted using the intra prediction mode from its parent CU; Partition 1, which is the remaining child partition of the target intra CU, is intra-predicted using 1) either a default intra prediction mode (i.e., the DC/Horizontal/Vertical mode), 2) or a signaled intra prediction mode out of remaining pre-defined intra prediction modes.

For the sake of simplicity, Partition 1 could be automatically intra-predicted using DC mode. In this case, cu_sbp_mode is set as 1 (DC mode). The sample values of current Partition 1 are predicted by computing average of the reference samples from left or/and above neighbors; and the top-left corner reference sample will not be used for its prediction if the DC mode is applied. This implementation could address the case that a block has a changing region along certain directions and a constant changing region at the same time.

Figure 17:
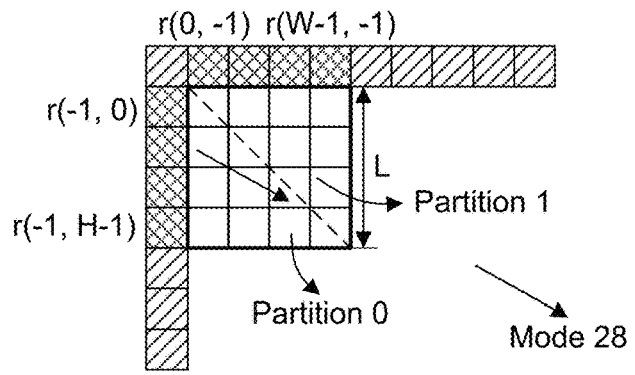
FIG. 17 illustrates an example where Partition 1 is a symmetric triangle-shaped partition.

If the target intra CU is a square block, then Partition 1 is a symmetric triangle-shaped partition as shown in FIG. 17 (reference samples used for Partition 1 are marked in dark gray). The reference samples from both left and above neighbors along the length L are both used to compute the average according to the following equation:

$$p(x, y) = \frac{\sum_{x=0}^{L-1} r(x, -1) + \sum_{y=0}^{L-1} r(-1, y)}{2L},$$

where the length L equals to the width/height of the square block L=W or H. The reference samples used for the prediction of Partition 1 are marked in dark gray in this example.

Figure 18:
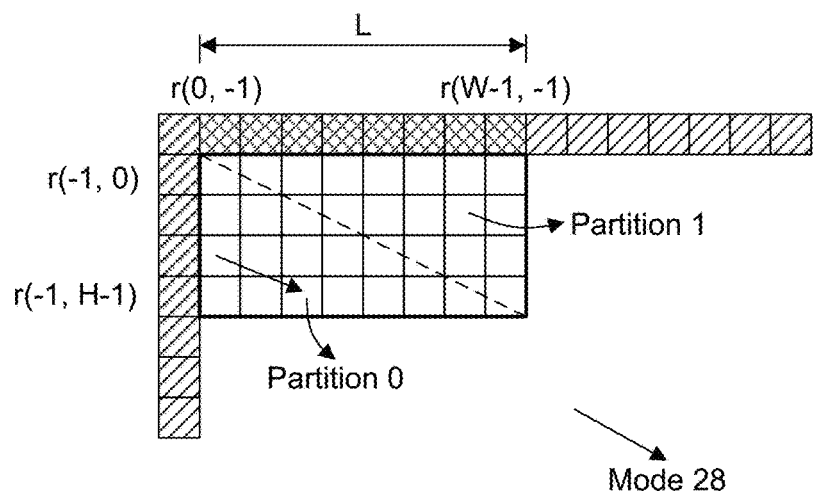
FIG. 18 illustrates examples where Partition 1 is an asymmetric triangle-shaped partition.
Figure 18:
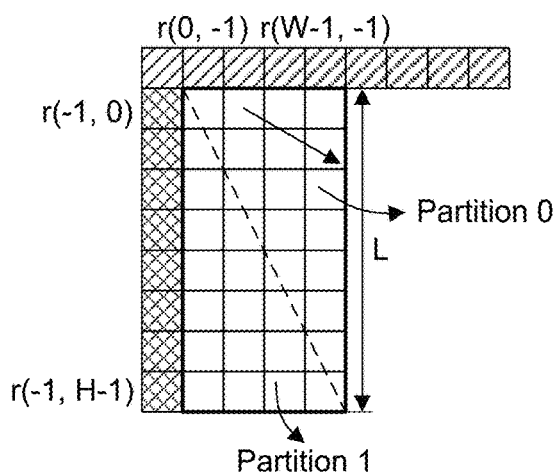

If the target intra CU is a rectangular block, to avoid division operations for generating DC prediction, only the longer side along the left and above neighbors is used to compute the average for an asymmetric triangle-shaped partition as shown in FIG. 18.

If the horizontal side of Partition 1 is longer, the intra-prediction p(x,y) is derived by averaging the reference samples from top neighbors along the length L according to the following equation:

$$p(x, y) = \frac{\sum_{x=0}^{L-1} r(x, -1)}{L}.$$

Similarly, if the vertical side of Partition 1 is longer, the intra-prediction p(x,y) is derived by averaging the reference samples from left neighbors along the length L according to the following equation:

$$p(x, y) = \frac{\sum_{y=0}^{L-1} r(-1, y)}{L}.$$

According to a variant for an asymmetric triangle-shaped partition, rather than using DC mode, the sample values of Partition 1 can be predicted by using Horizontal mode (cu_sbp_mode=18) or Vertical mode (cu_sbp_mode=50).

Figure 19:
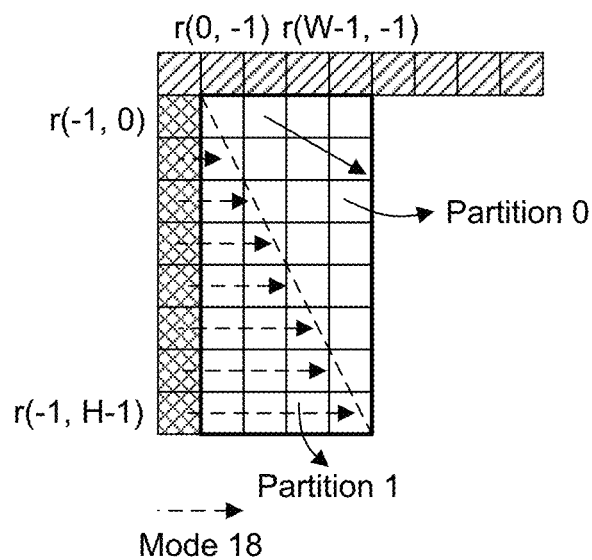
FIG. 19 illustrates an example where cu_sbp_mode is implicit as Horizontal/Vertical mode when Partition 1 is an asymmetric triangle-shaped partition.
Figure 19:
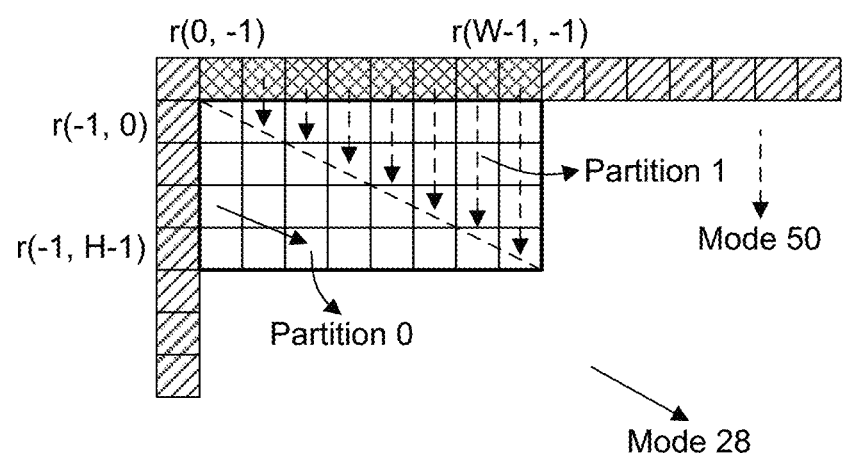

If the vertical side of Partition 1 along the left and above neighbors is longer, Horizontal mode (mode 18) is implicit as the intra prediction mode of Partition 1. Intra-prediction p(x,y) is derived by copying the reference samples in horizontal direction as shown in FIG. 19. Similarly, Vertical mode (mode 50) is applied if the horizontal side of Partition 1 along the left and above neighbors is longer, intra-prediction p(x,y) is derived by copying the reference samples in vertical direction.

According to another variant, for an asymmetric triangle-shaped partition, the sample values of current Partition 1 can be predicted by using one mode selected from DC and Horizontal/Vertical modes. In this case, cu_sbp_mode is signaled with one additional bit into the bitstream.

According to another variant, to predict Partition 1 more accurately and flexibly, Partition 1 could be intra-predicted using a signaled intra prediction mode cu_sbp_mode out of remaining pre-defined modes based on the optimal RD cost. In this case, if the mode cu_sbp_mode of Partition 1 belongs to DC or Horizontal/Vertical modes, the top-left corner reference sample will not be used for the prediction; if the mode cu_sbp_mode is one of other intra modes, the top-left corner reference sample could be used.

In order to speed up the mode selection process at the encoder, the candidate number of intra prediction modes could be limited, or another most probable mode (MPM) list could be used for the intra prediction mode cu_sbp_mode of Partition 1. For example, a list with 3 MPMs is generated by considering the intra modes of the left and above neighbouring block of Partition 1. Suppose the mode of the left is denoted as Left and the mode of the above block is denoted as Above.

Figure 20:
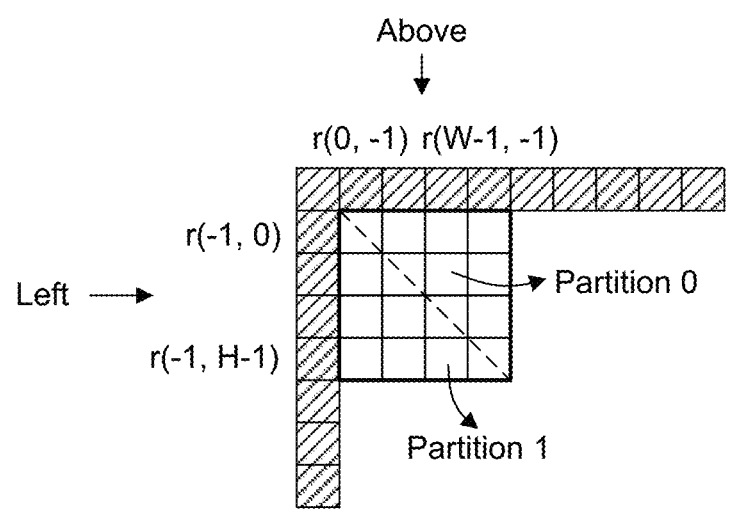
FIG. 20 illustrates an example where both modes Left and Above are available.

If both modes Left and Above are available and they are different as shown in FIG. 20, the MPM list is constructed as follows:
  If both modes Left and Above are non-angular modes:
    MPM list→{DC, V, H}
  If one of modes Left and Above is angular mode, and the other is non-angular mode:
    Set a mode Max as the larger mode in Left and Above
    MPM list→{Max, DC, Max-1}
  If both modes Left and Above are angular modes:
    if the Partition 1 is a symmetric triangle-shaped partition
      MPM list→{DC, Left, Above}
    if the Partition 1 is an asymmetric triangle-shaped partition, and horizontal side of Partition 1 along the left and above neighbors is longer
      MPM list→{Left, H, Above}
    Otherwise
      MPM list→{Above, V, Left}

Figure 21:
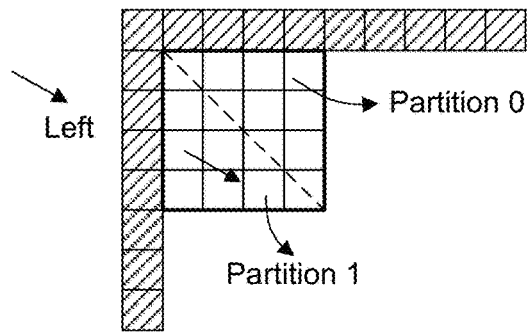
FIG. 21(a) illustrates an example where only Left neighboring mode is available.
FIG. 21(b) illustrates an example where only Above neighboring mode is available.
FIG. 21(c) illustrates an example where modes Left and Above are the same.
Figure 21:
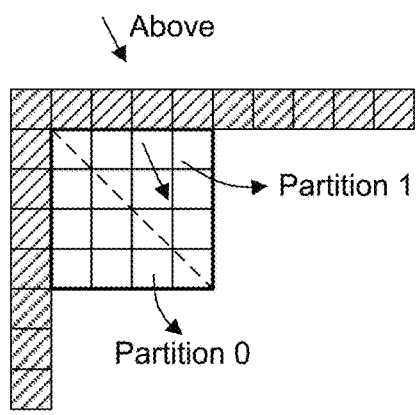
Figure 21:
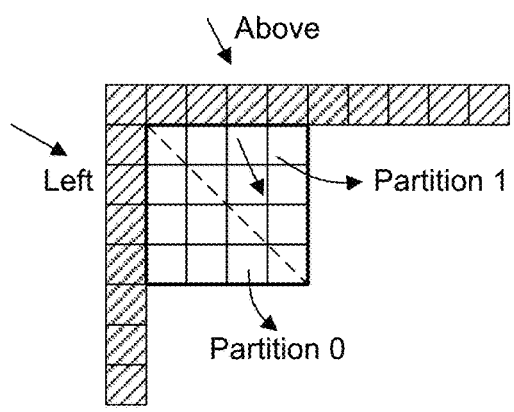

If only one of modes Left and Above is available, or if both modes Left and Above are angular and they are equal, the Partition 1 could just infer this available mode Left or Above for intra-prediction as shown in FIG. 21.

A Blending Process with Adaptive Weights (1450)

Figure 22:
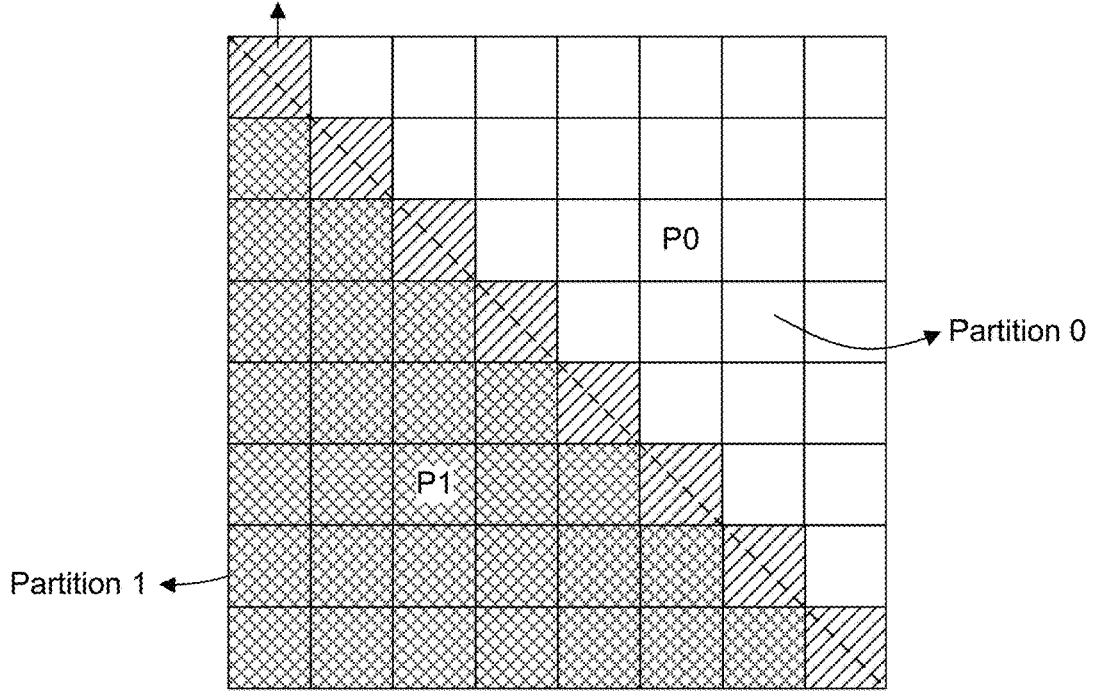
FIG. 22 illustrates an example of a blending mask for the intra diagonal partition, according to an embodiment.

After predicting each of the partitions, the sample values on the splitting edge are adjusted using a blending process of the prediction $pred_{P0}(x,y)$ for P0 and the prediction $pred_{P1}(x,y)$ for P1 with an adaptive factor W using the following equation:

$$pred_{boundary}(x,y) = W * pred_{P0}(x,y) + (1-W) * pred_{P1}(x,y),$$

where the weighting factor could be ½ or ¾, or other values, as shown in FIG. 22.

To further reduce the boundary effects along the two partitions P0 and P1, same as Triangle Partitioning mode (TPM), the proposed diagonal partition based intra prediction can operate using two intra prediction modes m and cu_sbp_mode to produce a final predicted block $pred_{final}(x, y)$ with two predictions $pred_0(x,y)$ and $pred_1(x,y)$ for the CU using the blending masks $W_0$ and $W_1$ as in the following equation:

$$pred_{final}(x,y) = W_0 * pred_0(x,y) + W_1 * pred_1(x,y).$$

Figure 23:
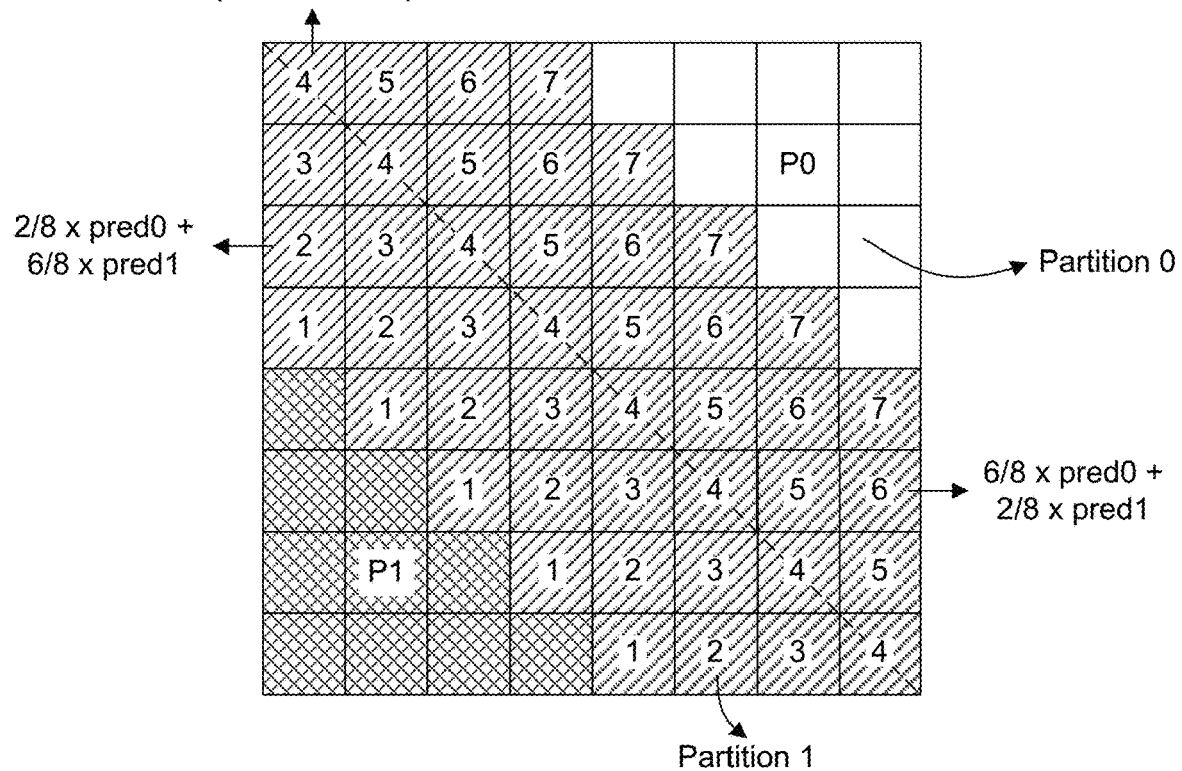
FIG. 23 illustrates another example of blending masks for the intra diagonal partition, according to an embodiment.

The blending masks of the proposed intra diagonal partition $W_0$ and $W_1$ are derived from the distance between the sample position and the split boundary as shown in FIG. 23. In this example, the weights {⅞, 6/8, ⅝, 4/8, ⅜, 2/8, ⅛} are used in the blending process.

Figure 24:
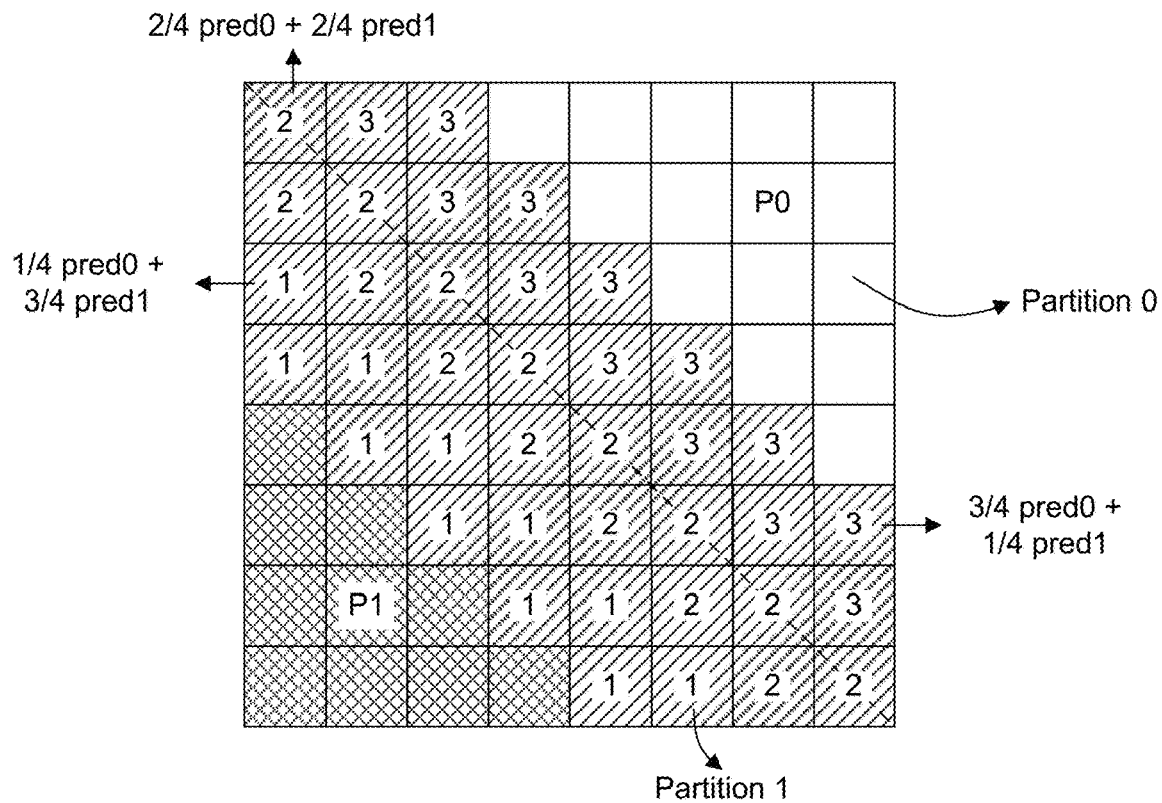
FIG. 24 illustrates another example of blending factors for the intra diagonal partition, according to an embodiment.
Figure 24:
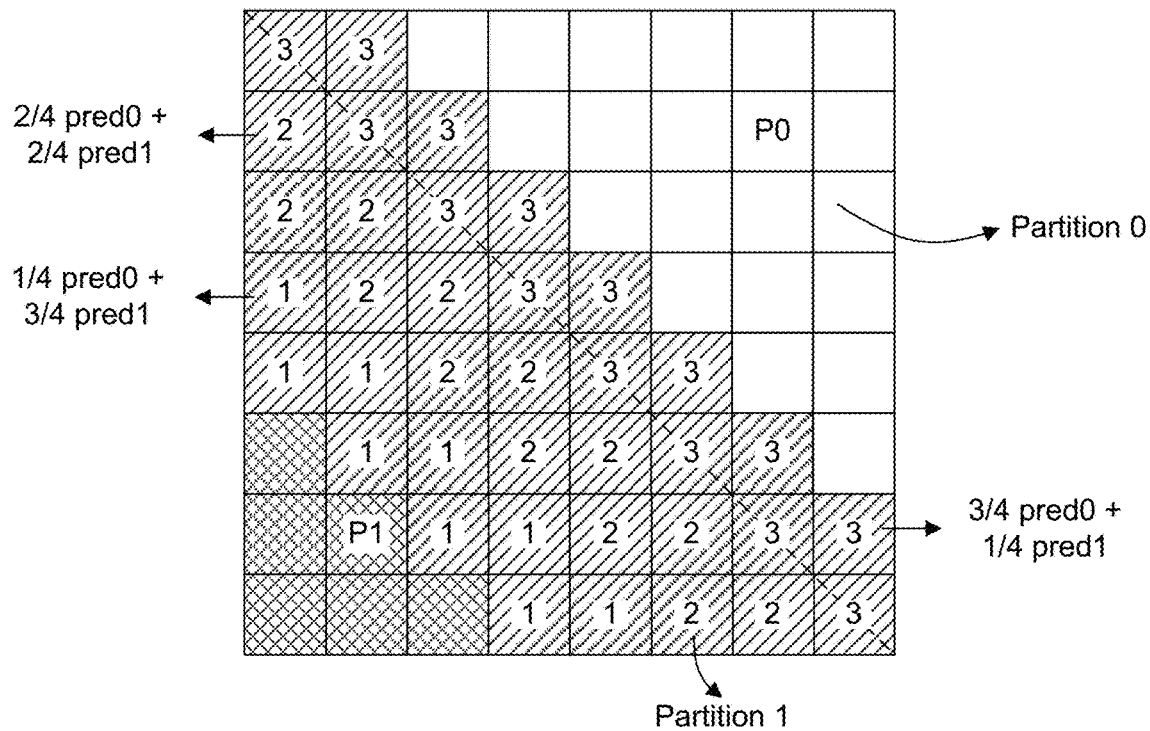

According to a variant, the blending masks of the intra diagonal partition $W_0$ and $W_1$ could also be asymmetric around the diagonal edge as shown in FIG. 24. The prediction $pred_0(x,y)$, wherein the intra prediction mode of the partition is inferred from the intra mode of the block, could use larger weight for blending. In this example, the weights {¾, 2/4, ¼} are used in the blending process.

According to another variant, the blending could only be processed at the diagonal edge with a weighting factor W using the following equation:

$$pred_{final}(x,y) = W * pred_0(x,y) + (1-W) * pred_1(x,y).$$

The weighting factor could be ½ or ¾, or other values.

Geometric Partition for Negative-Directional Intra Prediction Mode

In the above, a CU is split into two parts by a diagonal line. More generally, we propose to split an intra-predicted CU into two parts by a geometrically located straight line to better align the edge/boundary of the two regions. The splitting line could be parallel to the intra prediction mode or be selected from several specific partitions; and the splitting line could start from top-left position (0, 0) or with an offset.

Similarly to the diagonal partition based intra prediction, the proposed geometric partition based intra prediction could further split an intra-predicted CU into two partitions. Then each geometric partition within the CU, Partition 0 and Partition 1, is intra-predicted with its own intra mode using its available reference samples, respectively. After predicting each geometric partition, the sample values along the split boundary are adjusted using a blending process with adaptive weights. The weighting factors could be derived from the distance of the sample position and the split boundary.

Split Boundary Derivation for Geometric Partition Based Intra Prediction

As described above, a geometric partition can split the target CU into two parts by a splitting line that is parallel to the direction associated with the intra prediction mode of this CU.

Figure 25:
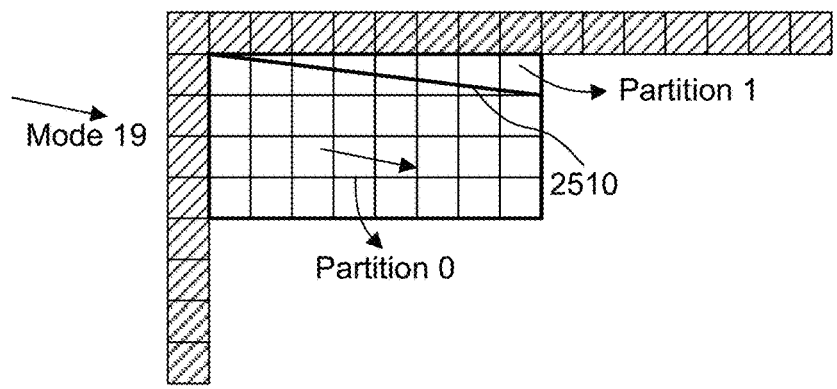
FIG. 25 illustrates an example where the split boundary is parallel to the intra prediction mode for the intra geometric partition, according to an embodiment.
Figure 25:
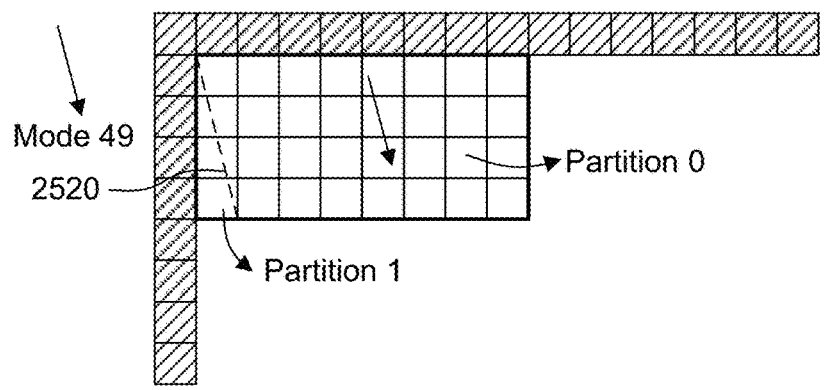
Figure 25:
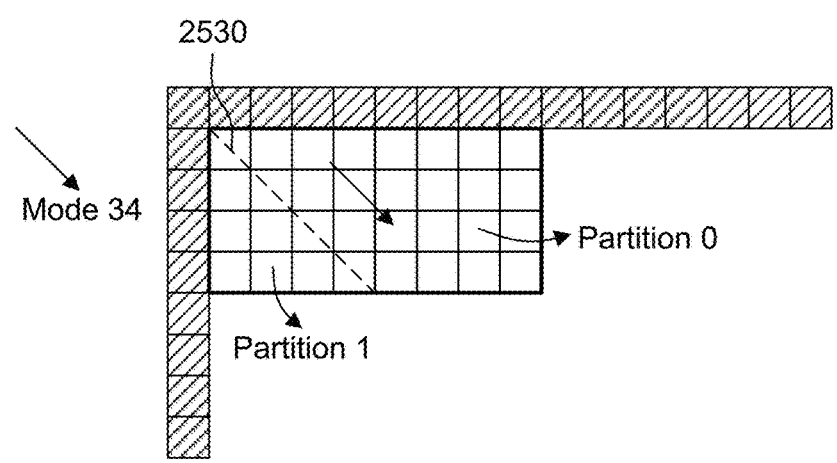

As shown the examples in FIG. 25(a), if the intra prediction mode is mode 19, then the split boundary (2510) is parallel to a horizontal negative direction; or if the intra prediction mode is mode 49 as shown in FIG. 25(b), the split boundary (2520) is parallel to a vertical negative direction. If the intra prediction direction of the target intra CU is mode 34 as shown in FIG. 25(c), then the diagonal splitting (2530) as described before is applied for square block; and the 45 degree splitting, which is parallel to the mode 34, is applied for rectangular block.

Figure 26:
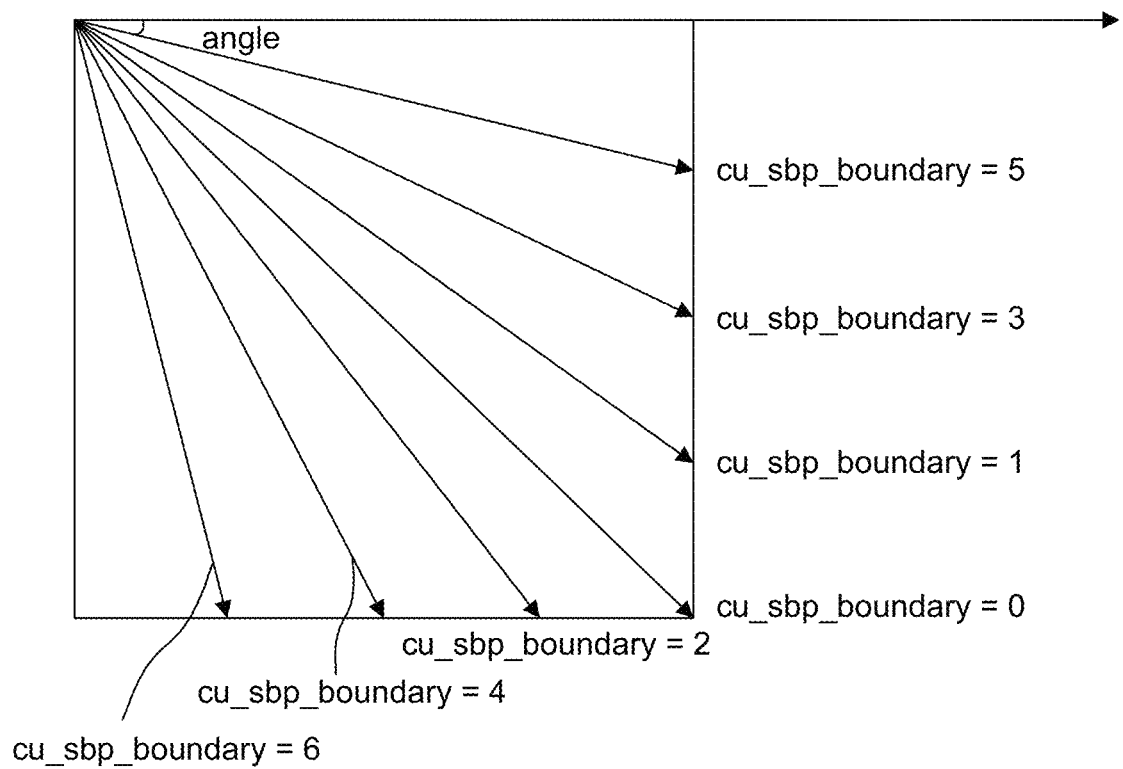
FIG. 26 illustrates an example where the split boundary is indicated by cu_sbp_boundary for the intra geometric partition, according to an embodiment.

To further increase the splitting flexibility of the proposed intra geometric partition, the split boundary can be selected from several pre-defined partitions as shown in FIG. 26. In this example, there are seven pre-defined split boundaries, each of which represents an angle between 0 and −90 degrees with 11.25 degrees steps. For this example, a syntax element cu_sbp_boundary is signaled to indicate which splitting boundary is applied.

According to another variant, the number of pre-defined split boundaries could be any other value than 7, and it could also be a different value adapting to the intra prediction mode. For example, if the intra prediction mode belongs to horizontal negative directions (modes 19 to 33 as shown in FIG. 6), then only half of the split boundaries that are close to the above part in FIG. 26 will be applied.

Splitting Line Start Position for Geometric Partition cu_sbp_start

As mentioned above, a splitting line for geometric partition of the target CU can start from the top-left position (0, 0), or the splitting start position could be shifted with an offset to better align with the geometric edge/boundary of the two child partitions.

Figure 27:
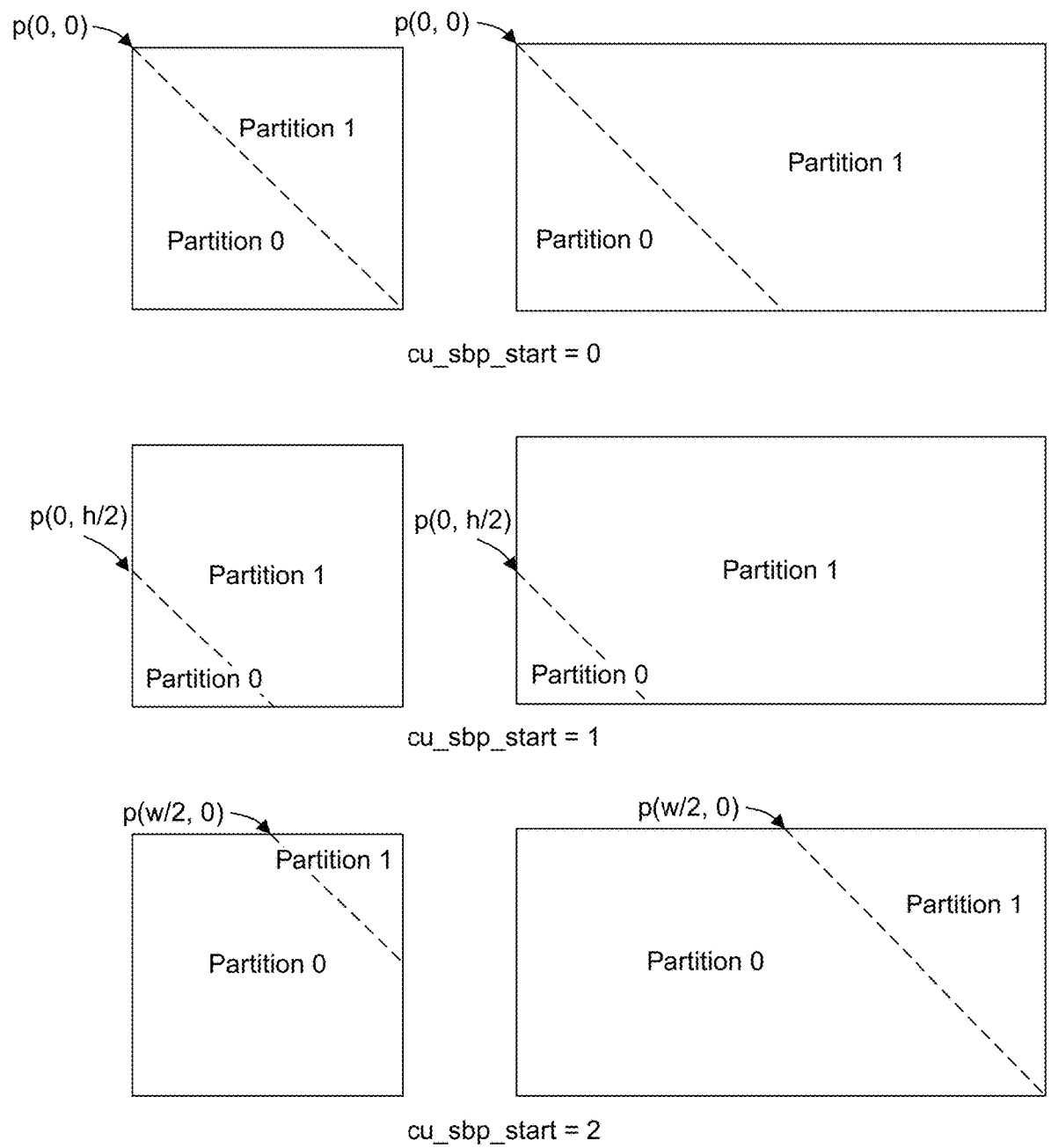
FIG. 27 illustrates three pre-defined splitting start positions for geometric partition based intra prediction, according to an embodiment.

In this case, a syntax element cu_sbp_start is signaled to indicate where the splitting start position locates. Taken mode 34 as an example as illustrated in FIG. 27, there are three pre-defined splitting start positions. The 45-degree splitting line starts from the top-left position p(0, 0) when cu_sbp_start equals to 0. If cu_sbp_start equals to 1, the 45-degree splitting line will start from the middle of the left boundary $$p\left(0, \frac{h}{2}\right).$$

Similarly, the 45-degree splitting line will start from the middle of the above boundary $$p\left(\frac{w}{2}, 0\right)$$

if cu_sbp_start equals 2. More splitting start positions could be pre-defined in the similar rule. For example, the splitting start position could be located at one quarter of the left or above boundary $$p\left(0, \frac{h}{4}\right), p\left(\frac{w}{4}, 0\right).$$

Figure 28:
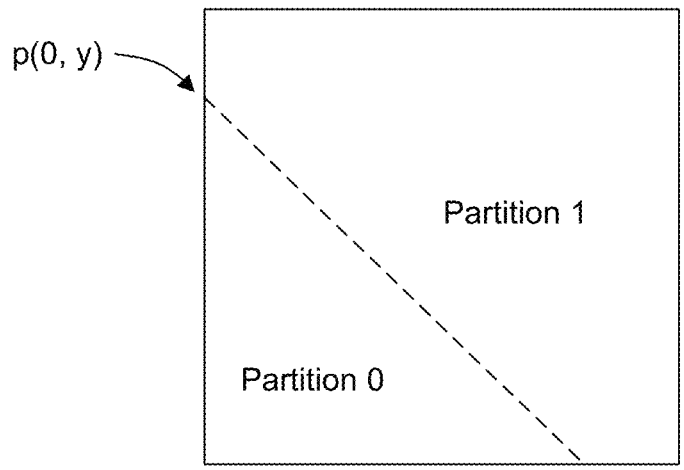
FIG. 28 illustrates an arbitrary splitting start positions for geometric partition based intra prediction, according to an embodiment.
Figure 28:
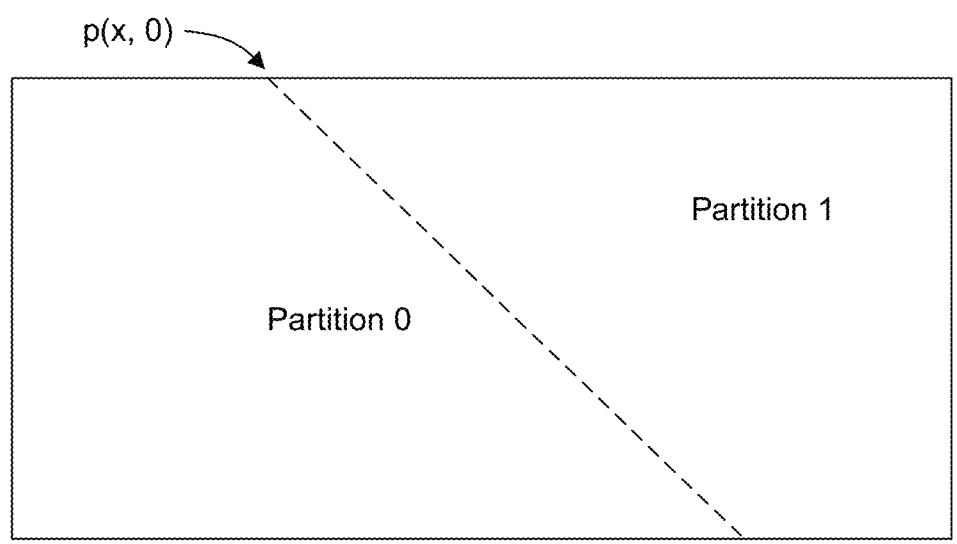

According to another variant, a 45-degree splitting of the target CU can start from an arbitrary position at the left or above boundary whose coordinate information is signaled into the bitstream as illustrated in FIG. 28. For this variant, a syntax flag cu_sbp_start_left is signaled to indicate whether the splitting start position is located on the left boundary; and then another syntax element cu_sbp_start_offset is signaled subsequently to indicate the distance between the splitting start position and the top-left position. If cu_sbp_start_left equals to 1, the geometric partition will start from an arbitrary position at the left boundary p (0,y), and the distance y is signaled as cu_sbp_start_offset into bitstream. Similarly, the geometric partition will start from an arbitrary position at the above boundary p(x,0) if cu_sbp_start_left equals to 0, and the distance x is signaled as cu_sbp_start_offset. This variant is more flexible to align with geometric edge/boundary, while the signaling of cu_sbp_start_offset could be quite costly.

Decision of Partition 0 and Partition 1 Based on the Area

Figure 29:
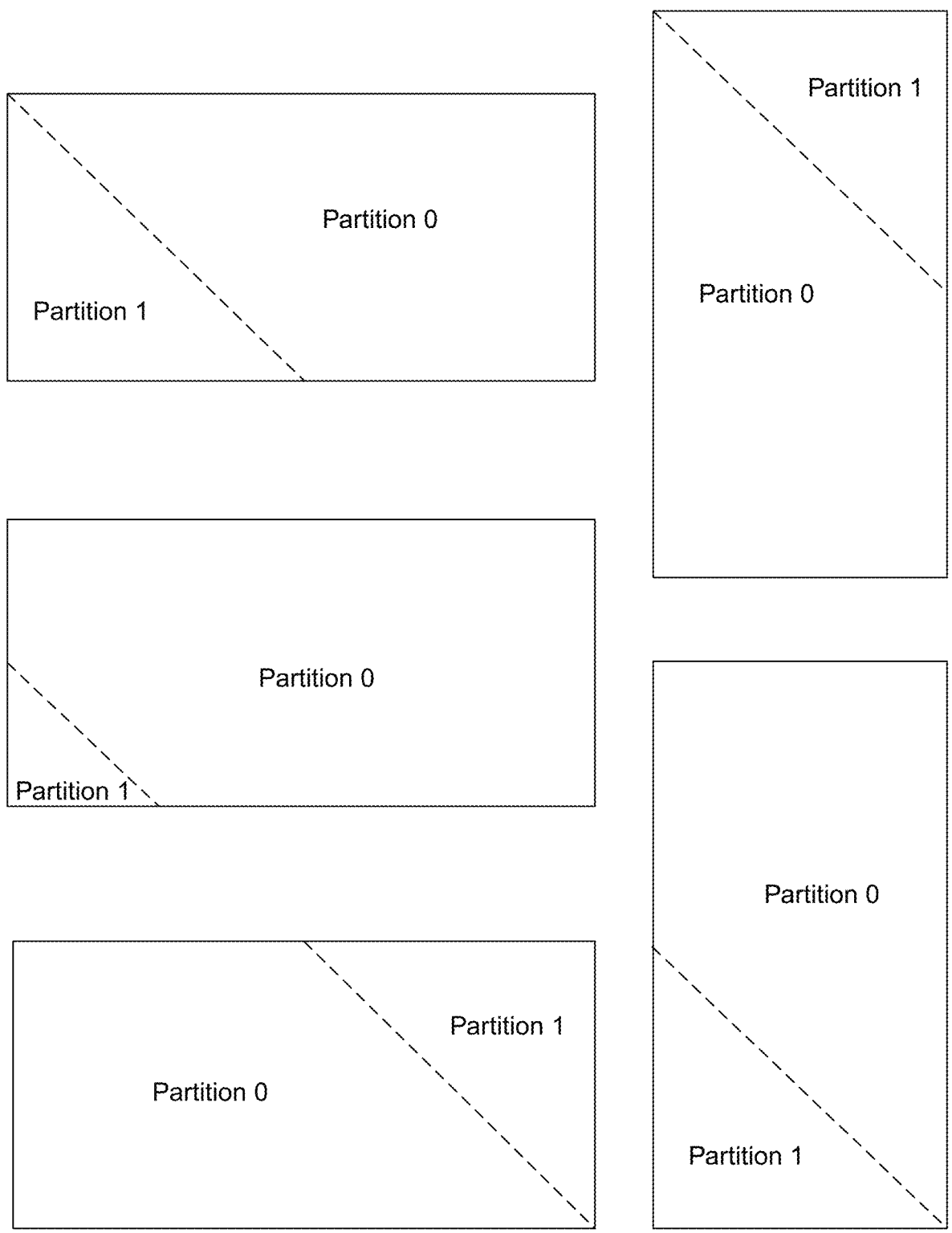
FIG. 29 illustrates an example to decide Partition 0 according to the area of these two child partitions, according to an embodiment.

Since a geometric partition can split the target CU into two asymmetric parts, Partition 0 could be implicit according to the area of these two child partitions of the target intra CU as shown in FIG. 29. The concept of this variant is to automatically set the region with the larger area among these two child partitions as Partition 0.

The reason for this proposed variant is that most areas of the target intra CU are likely to be predicted with the intra mode of this CU; only the remaining smaller areas having different changing property might need to be intra-predicted using another mode. Otherwise, this target CU should have been assigned with another intra prediction mode.

Geometric Partition Based Intra Prediction for Angular Mode

Rather than only checking geometric partition after a negative-directional intra prediction mode is selected as described above, in the third embodiment, we propose to split an intra-predicted CU into two parts by a geometrically located straight line after one angular intra prediction mode is selected and reference neighbouring samples for the two regions are available.

As a supplement to the geometric partition based intra prediction after a negative-directional intra prediction mode is selected, it is proposed that the geometric partition based intra prediction could further split an intra-predicted CU into two partitions from a top-right position with an offset, or from a bottom-left position with an offset, after a positive-directional intra prediction mode is selected. More details are described below.

Splitting Boundary and Splitting Start Position for Geometric Partition Based Positive-Directional Intra Prediction As described above, after a negative-directional intra prediction mode is selected, a geometric partition can split the target CU into two parts by a splitting line which is parallel to the intra prediction mode of this CU.

As a supplement for positive-directional intra prediction modes, a geometric partition based intra prediction could further split an intra-predicted CU into two partitions by a splitting line which is parallel to the intra prediction mode of this CU. The splitting start position could be either from a top-right position with an offset, or from a bottom-left position with an offset.

Figure 30:
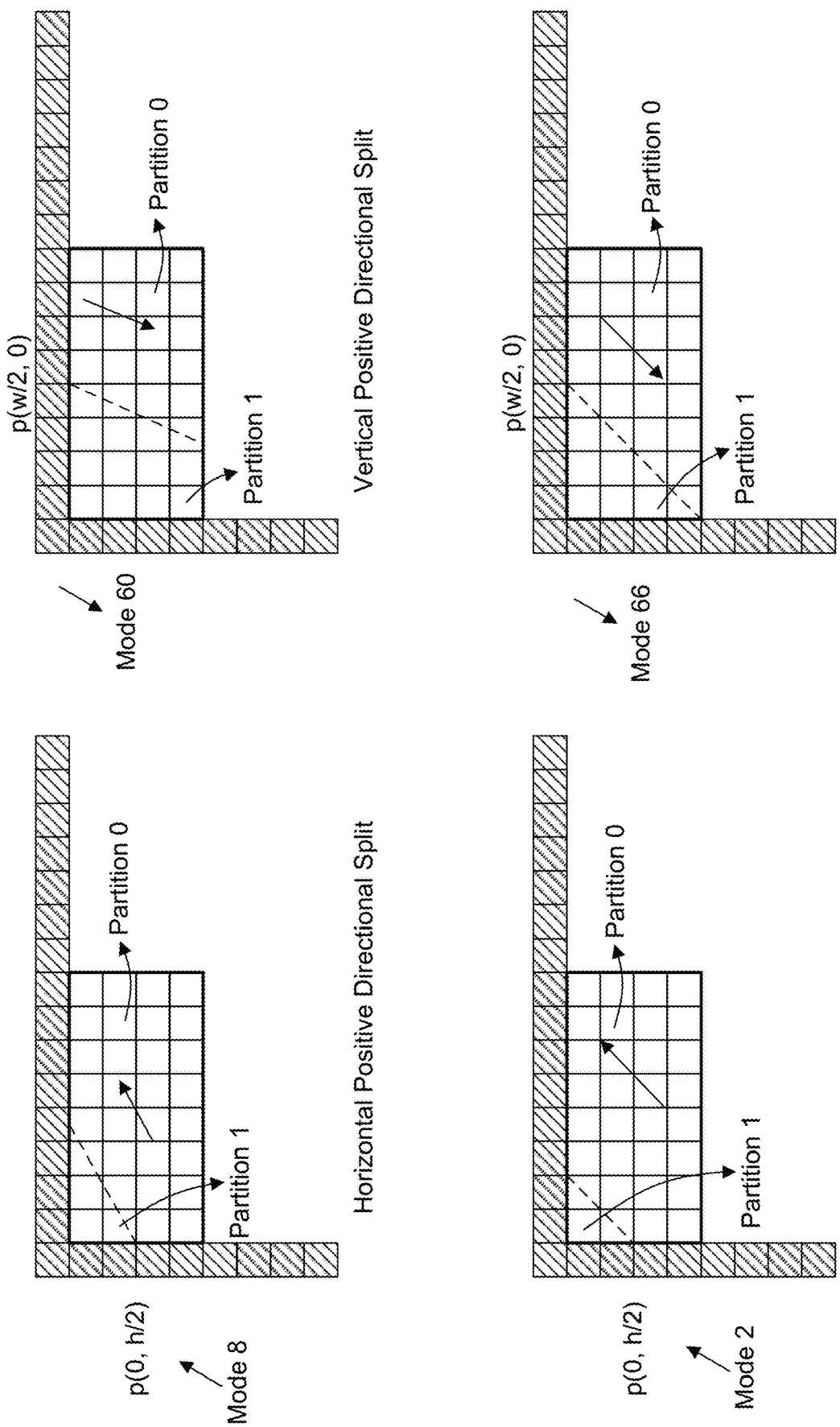
FIG. 30 illustrates an example of geometric partition for the positive-directional intra prediction mode, according to an embodiment.

As the examples shown in FIG. 30, the splitting line could be parallel to the positive-directional intra prediction mode of the target CU. If the intra prediction mode is mode 8, which belongs to horizontal positive direction, then the splitting line is parallel to a horizontal positive direction; or if the intra prediction mode is mode 60, one of the vertical positive directional modes, the splitting line is parallel to a vertical positive direction. If the intra prediction direction of the target intra CU is mode 2 or mode 66, then the 135-degree splitting is applied.

Figure 31:
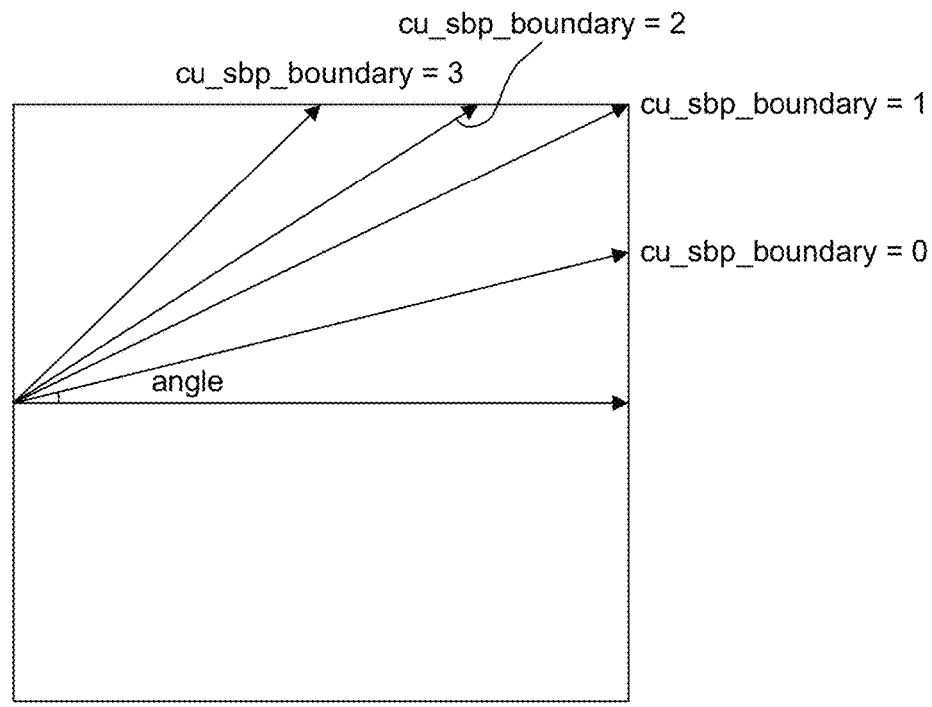
FIG. 31 illustrates an example where the split boundary is indicated by cu_sbp_boundary for the positive-directional intra prediction mode, according to an embodiment.
Figure 31:
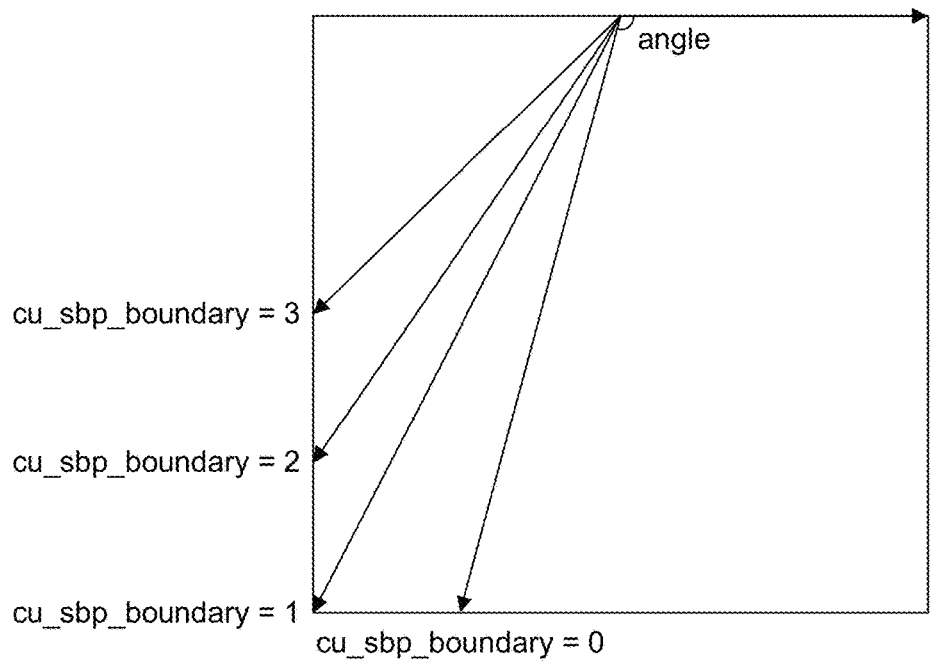

The splitting line for the positive-directional intra prediction modes, can also be selected from several pre-defined partitions as shown in the example of FIG. 31, to further increase the splitting flexibility. There are four pre-defined splitting boundaries for horizontal/vertical positive directional modes, respectively. The four pre-defined splitting boundaries in FIG. 31(*a*) are used for horizontal positive directional modes, each of which represents an angle between 0 and 45 degrees with 11.25 degrees steps. Another four pre-defined splitting boundaries in FIG. 31(*b*) are used for vertical positive directional modes, which represents an angle between −45 and −90 degrees with 11.25 degrees steps. For this variant, a syntax element cu_sbp_boundary is signaled to indicate which splitting boundary is applied.

Geometric or Diagonal Partition Based Intra Prediction Checking for Angular Intra Prediction Modes before the Optimal Intra Prediction Mode is Selected In the above, the proposed embodiments are all applied only after an angular intra prediction mode is selected via the recursive RDO search. One advantage is that it limits the search complexity for intra mode selection.

Rather than checking whether splitting the CU into two parts or not only after an angular intra prediction mode is selected, in the fourth embodiment, we propose that the geometric/diagonal intra partition could be checked for angular intra prediction mode candidates during the recursive RDO search before the best intra prediction mode is selected. That is, the RD cost of some or all angular intra prediction modes with or without using geometric/diagonal intra partition could be both calculated, and the remaining intra prediction modes will only calculate the RD cost without splitting. The final intra prediction mode is selected from all these possible situations, which could lead to the best RD performance.

A sub-partition flag cu_sbp_flag is signaled for an intra predicted CU with an angular intra prediction mode, which belongs to the modes needed to check splitting or not. The proposed geometric/diagonal intra partition is further applied on this intra CU if cu_sbp_flag equals to 1.

Figure 32:
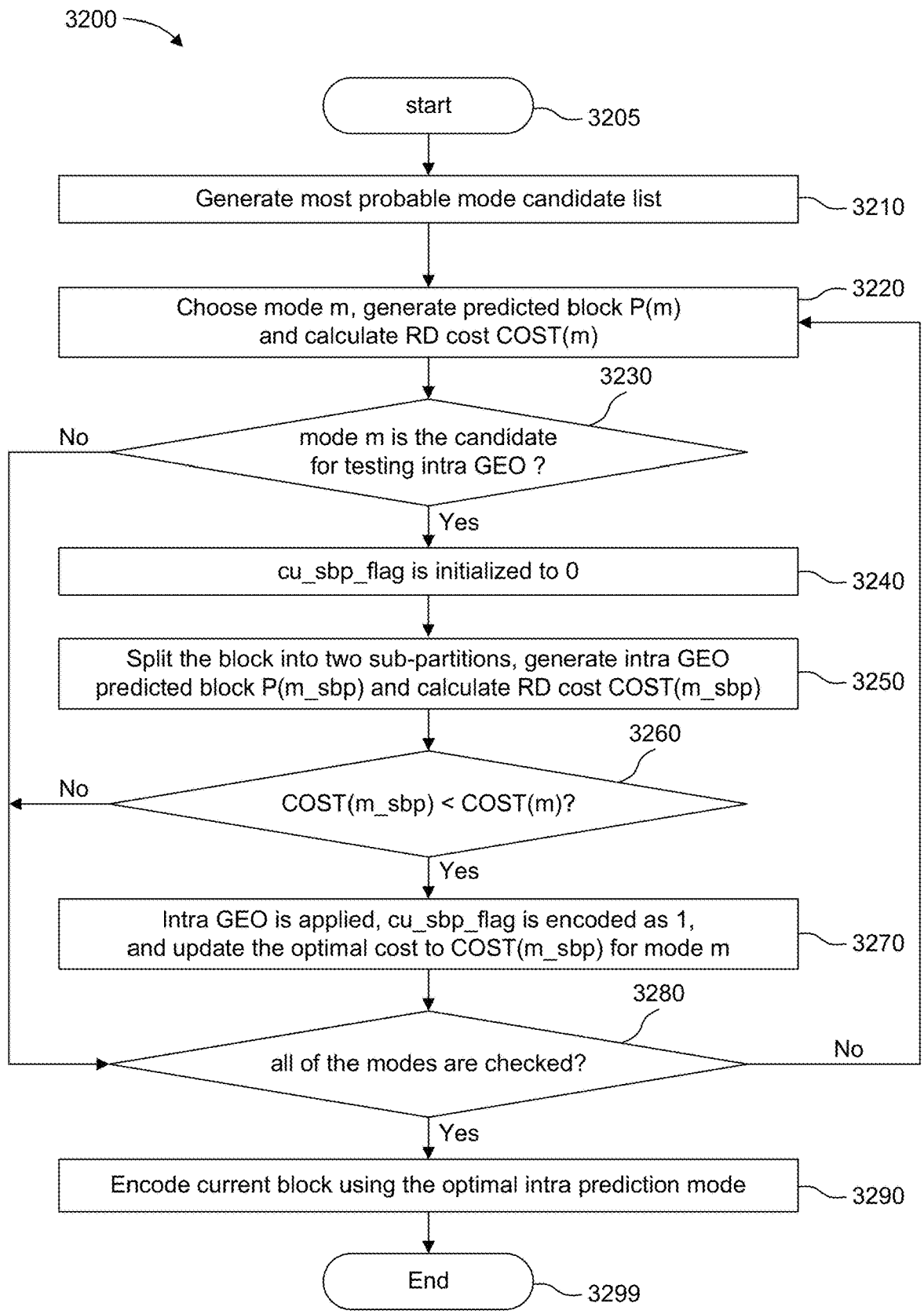
FIG. 32 illustrates an intra prediction mode searching process at the encoder, according to an embodiment.

FIG. 32 illustrate a method (3200) for performing intra prediction mode searching at the encoder, according to an embodiment. Method 3200 starts at step 3205. At step 3210, the most probable mode (MPM) candidate list is generated. At steps 3220, the encoder checks a potential intra prediction mode m, by generating prediction blocks P(m) and calculating the RD cost COST(m). For an intra mode that is one of candidates to check the geometric intra partition (3230), a sub-partition flag cu_sbp_flag to indicate whether the block is split into two sub-partitions diagonally or not, is initialized to 0 (3240), and the block is split into two sub-partitions and the RD cost COST(m_sbp) is calculated (3250). If the geometric partition based intra prediction has a smaller RD cost (3260), geometric partition is applied for the intra block, the sub-partition flag cu_sbp_flag is encoded as 1, and the optimal cost is updated to COST(m_sbp) (3270). At step 3280, the encoder checks whether all modes are checked. If not, the control returns to step 3220. Otherwise, the encoder encodes (3290) the current block using the optimal intra prediction mode. Method 3200 ends at step 3299.

Compared to method 1300, this embodiment (3200) increases the searching complexity and the signaling cost of cu_sbp_flag, while it optimizes the best intra prediction mode searching. In order to balance the complexity and coding efficiency, some searching speed-up schemes are described in the following variants.

According to a variant of this embodiment, only when one specific intra prediction mode (e.g., mode 34) is checked, the proposed geometric/diagonal intra partition can be enabled to be checked.

According to another variant of this embodiment, only when one negative-directional intra prediction mode is checked, the proposed geometric/diagonal intra partition can be enabled to be checked.

According to another variant of this embodiment, the geometric/diagonal intra partition can only be enabled to be checked, when one of its left or above neighbouring block applies the geometric/diagonal intra partition.

According to another variant of this embodiment, the geometric/diagonal intra partition can only be enabled to be checked, when both its left and above neighbouring blocks apply the geometric/diagonal intra partition.

Transform Selection for Proposed Intra Geometric/Diagonal Partition

After the final prediction signal for the whole CU is obtained by the process described above, then transform and quantization process will be applied to the whole CU as in other intra prediction modes. The transform selection could be adapted to the intra geometric partition in this embodiment.

In VVC, in addition to DCT2, a Multiple Transform Selection (MTS) scheme is used for residual coding in both intra and inter coded blocks. It uses multiple selected transforms from the DCT8/DST7. Transform and signaling mapping table is shown in Table 2. The introduction of MTS improves the efficiency of transform in VVC while the exhaustive RDO search for the optimal transform candidates brings large computational burden to the VVC encoder.

TABLE 2 transform and signaling mapping table.

| MTS_CU_flag | MTS_Hor_flag | MTS_Ver_flag | Intra/inter Horizontal | Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

In VVC, a CU level flag is signalled to indicate whether MTS is applied or not. In the fifth embodiment, we propose that the MTS CU level flag is not signalled but inferred, when the proposed intra geometric/diagonal partition is applied.

If the difference between the intra prediction mode of the two splitting partitions (Partition 0 and Partition 1) is smaller than a pre-defined threshold, or if Partition 1 is intra-predicted using the DC mode, then the MTS CU level flag is inferred as zero, where DCT2 is applied in both directions. For the remaining cases, whose contents are normally with very complex textures, only one single transform (DCT2) is not efficient to model the different statistical variations, then MTS is highly possible to apply. The MTS CU level flag is inferred as one, then two flags are directly signalled to indicate the transform type for the horizontal and vertical directions as shown in Table 3, respectively.

TABLE 3 transform and signaling mapping table when proposed intra geometric/diagonal partition is applied cu_sbp_flag = 1.

| MTS_Hor_flag | MTS_Ver_flag | Intra cu sbp flag = 1 Horizontal | Vertical |
|---|---|---|---|
| 0 | 0 | DST7 | DST7 |
| 0 | 1 | DCT8 | DST7 |
| 1 | 0 | DST7 | DCT8 |
| 1 | 1 | DCT8 | DCT8 |

According to a variant of this embodiment, the transform type for an intra CU using intra geometric partition can be implicitly derived from the intra prediction mode of the target intra CU. The same logics can be implemented differently in practice by using different coding parameters.

According to a variant of the embodiments mentioned before, it could further narrow down the range of the directional intra prediction modes wherein the proposed geometric/diagonal intra partition can be enabled. For example, only after one intra prediction mode from modes 26-42 is selected, the proposed geometric/diagonal intra partition can be enabled.

According to another variant of the embodiments mentioned before, the target CU could be split into more than two parts.

According to another variant of the embodiments mentioned before, the intra sub-partition (ISP) is not allowed when the proposed geometric/diagonal intra partition is applied for the current CU.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the intra prediction modules (260, 360), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
obtaining an intra prediction mode for a block of a picture;
determining a straight line based on said intra prediction mode for said block, wherein said straight line is set to be parallel to a direction associated with said intra prediction mode for said block;
splitting said block of said picture into at least two partitions by said straight line, said straight line being different than a horizontal line or a vertical line;
performing intra prediction with a first intra prediction mode to obtain prediction samples for a first partition of said at least two partitions, said first intra prediction mode corresponding to said intra prediction mode for said block;
performing intra prediction with a second intra prediction mode to obtain prediction samples for a second partition of said at least two partitions;
adjusting values of said prediction sample, of said first and second partitions, along said straight line using a blending process with adaptive weights; and
decoding said block based on said prediction samples of said first and second partitions.

2. The method of claim 1, wherein said splitting, performing and adjusting are only applied when said first intra prediction mode is an angular prediction mode.

3. The method of claim 1, wherein said adaptive weights are asymmetric around said straight line.

4. The method of claim 1, further comprising:
determining one of said at least two partitions to be said first partition based on sizes of said at least two partitions.

5. The method of claim 1, further comprising:
selecting one or more transforms for said block based on at least one of said first and second intra prediction modes.

6. A method for video encoding, comprising:

obtaining an intra prediction mode for a block of a picture;

determining a straight line based on said intra prediction mode for said block, wherein said straight line is set to be parallel to a direction associated with said intra prediction mode for said block;

splitting said block of said picture into at least two partitions by said straight line, said straight line being different than a horizontal line or a vertical line;

performing intra prediction with a first intra prediction mode to obtain prediction samples for a first partition of said at least two partitions, said first intra prediction mode corresponding to said intra prediction mode for said block;

performing intra prediction with a second intra prediction mode to obtain prediction samples for a second partition of said at least two partitions;

adjusting values of said prediction samples, of said first and second partitions, along said straight line using a blending process with adaptive weights; and encoding said block based on said prediction samples of said first and second partitions.

7. The method of claim 6, further comprising:

encoding said first intra prediction mode for said first partition, wherein said splitting, performing and adjusting are only applied when said first intra prediction mode is an angular prediction mode.

8. The method of claim 6, wherein said adaptive weights are asymmetric around said straight line.

9. The method of claim 6, further comprising:

determining one of said at least two partitions to be said first partition based on sizes of said at least two partitions.

10. The method of claim 6, further comprising:

selecting one or more transforms for said block based on at least one of said first and second intra prediction modes.

11. An apparatus for video decoding, comprising one or more processors and at least one memory, wherein said one or more processors are configured to:

obtain an intra prediction mode for a block of a picture;

determine a straight line based on said intra prediction mode for said block, wherein said straight line is set to be parallel to a direction associated with said intra prediction mode for said block;

split said block of said picture into at least two partitions by a said straight line, said straight line being different than a horizontal line or a vertical line;

perform intra prediction with a first intra prediction mode to obtain prediction samples for a first partition of said at least two partitions, said first intra prediction mode corresponding to said intra prediction mode for said block;

perform intra prediction with a second intra prediction mode to obtain prediction samples for a second partition of said at least two partitions;

adjust values of said prediction sample, of said first and second partitions, along said straight line using a blending process with adaptive weights; and decode said block based on said prediction samples of said first and second partitions.

12. The apparatus of claim 11, wherein said one or more processors are configured to split, perform and adjust only when said first intra prediction mode is an angular prediction mode.

13. The apparatus of claim 11, wherein said adaptive weights are asymmetric around said straight line.

14. The apparatus of claim 11, wherein one of said at least two partitions is determined to be said first partition based on sizes of said at least two partitions.

15. The apparatus of claim 11, wherein said one or more processors are further configured to:

select one or more transforms for said block based on at least one of said first and second intra prediction modes.

16. An apparatus for video encoding, comprising one or more processors and at least one memory, wherein said one or more processors are configured to:

obtain an intra prediction mode for a block of a picture;

determine a straight line based on said intra prediction mode for said block, wherein said straight line is set to be parallel to a direction associated with said intra prediction mode for said block;

split said block of said picture into at least two partitions by a said straight line, said straight line being different than a horizontal line or a vertical line;

perform intra prediction with a first intra prediction mode to obtain prediction samples for a first partition of said at least two partitions, said first intra prediction mode corresponding to said intra prediction mode for said block;

perform intra prediction with a second intra prediction mode to obtain prediction samples for a second partition of said at least two partitions;

adjust values of said prediction samples, of said first and second partitions, along said straight line using a blending process with adaptive weights; and encode said block based on said prediction samples of said first and second partitions.

17. The apparatus of claim 16, wherein said one or more processors are further configured to:

encode said first intra prediction mode for said first partition, wherein said one or more processors are configured to split, perform and adjust only when said first intra prediction mode is an angular prediction mode.

18. The apparatus of claim 16, wherein said adaptive weights are asymmetric around said straight line.

19. The apparatus of claim 16, wherein one of said at least two partitions is determined to be said first partition based on sizes of said at least two partitions.

20. The apparatus of claim 16, wherein said one or more processors are further configured to:

select one or more transforms for said block based on at least one of said first and second intra prediction modes.

* * * * *